United States Patent
Larsen

(10) Patent No.: US 11,741,255 B2
(45) Date of Patent: Aug. 29, 2023

(54) SYSTEM AND METHOD OF BLOCK CHAIN BASED PROTECTION FOR CUSTOMIZED DATA INTEGRATION PROCESSES

(71) Applicant: BOOMI, INC., Round Rock, TX (US)

(72) Inventor: Christopher S. Larsen, Rochester, MN (US)

(73) Assignee: BOOMI, LP, Chesterbrook, PA (US)

(*) Notice: Subject to any disclaimer, the term of this patent is extended or adjusted under 35 U.S.C. 154(b) by 593 days.

(21) Appl. No.: 16/864,792

(22) Filed: May 1, 2020

(65) Prior Publication Data
US 2021/0342471 A1 Nov. 4, 2021

(51) Int. Cl.
*G06F 21/62* (2013.01)
*G06F 11/30* (2006.01)
*H04L 9/06* (2006.01)
*H04L 9/00* (2022.01)

(52) U.S. Cl.
CPC ...... *G06F 21/6245* (2013.01); *G06F 11/3086* (2013.01); *H04L 9/0637* (2013.01); *H04L 9/50* (2022.05)

(58) Field of Classification Search
CPC .... G06F 16/215; G06F 21/62; G06F 21/6218; G06F 21/602; G06F 16/2379; H04L 9/50
See application file for complete search history.

(56) References Cited

U.S. PATENT DOCUMENTS

| | | | | |
|---|---|---|---|---|
| 11,106,811 B2* | 8/2021 | Natanzon | ................ | G06F 3/067 |
| 11,483,131 B2* | 10/2022 | Huang | .................. | H04L 9/3239 |
| 2018/0157825 A1* | 6/2018 | Eksten | .................. | H04L 9/3247 |
| 2020/0143267 A1* | 5/2020 | Gidney | .................. | G06N 5/043 |
| 2021/0067328 A1* | 3/2021 | Verheyen | .............. | H04L 9/0861 |
| 2021/0182422 A1* | 6/2021 | Basu | ..................... | H04L 9/3213 |
| 2021/0216529 A1* | 7/2021 | Huang | ................... | G06F 21/62 |

\* cited by examiner

*Primary Examiner* — Olugbenga O Idowu
(74) *Attorney, Agent, or Firm* — Prol Intellectual Property Law, PLLC; H. Kenneth Prol

(57) ABSTRACT

A method of block chain based data protection may comprise receiving a user block chain instruction to record a address-identified memory location at which a dataset field value containing sensitive personal information is stored pursuant to a customized data integration process modeled via a graphical user interface, creating a block chain associated with the dataset field value, receiving an identification of the address-identified memory location from a customized data integration process remote execution location, and creating a first block storing the identification of the address-identified memory location within the block chain. The method may further comprise receiving a user deletion instruction to delete the dataset field value from the address-identified memory location, automatically generating a runtime engine and machine executable deletion code instructions for deletion of the dataset field value from the address-identified memory location, and transmitting the runtime engine and the machine executable deletion code instructions for execution at the remote execution location.

20 Claims, 10 Drawing Sheets

SYSTEM AND METHOD OF BLOCK CHAIN BASED PROTECTION FOR CUSTOMIZED DATA INTEGRATION PROCESSES

FIELD OF THE DISCLOSURE

The present disclosure relates generally to a system and method for deploying and executing customized data integration processes. More specifically, the present disclosure relates to identification and tracking of personally identifying datasets via block chain as they are manipulated during a customized data integration process.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities and require communication among a variety of data formats.

BRIEF DESCRIPTION OF THE DRAWINGS

The present disclosure will now be described by way of example with reference to the following drawings in which.

The use of the same reference symbols in different drawings may indicate similar or identical items.

DETAILED DESCRIPTION

Figure 1:
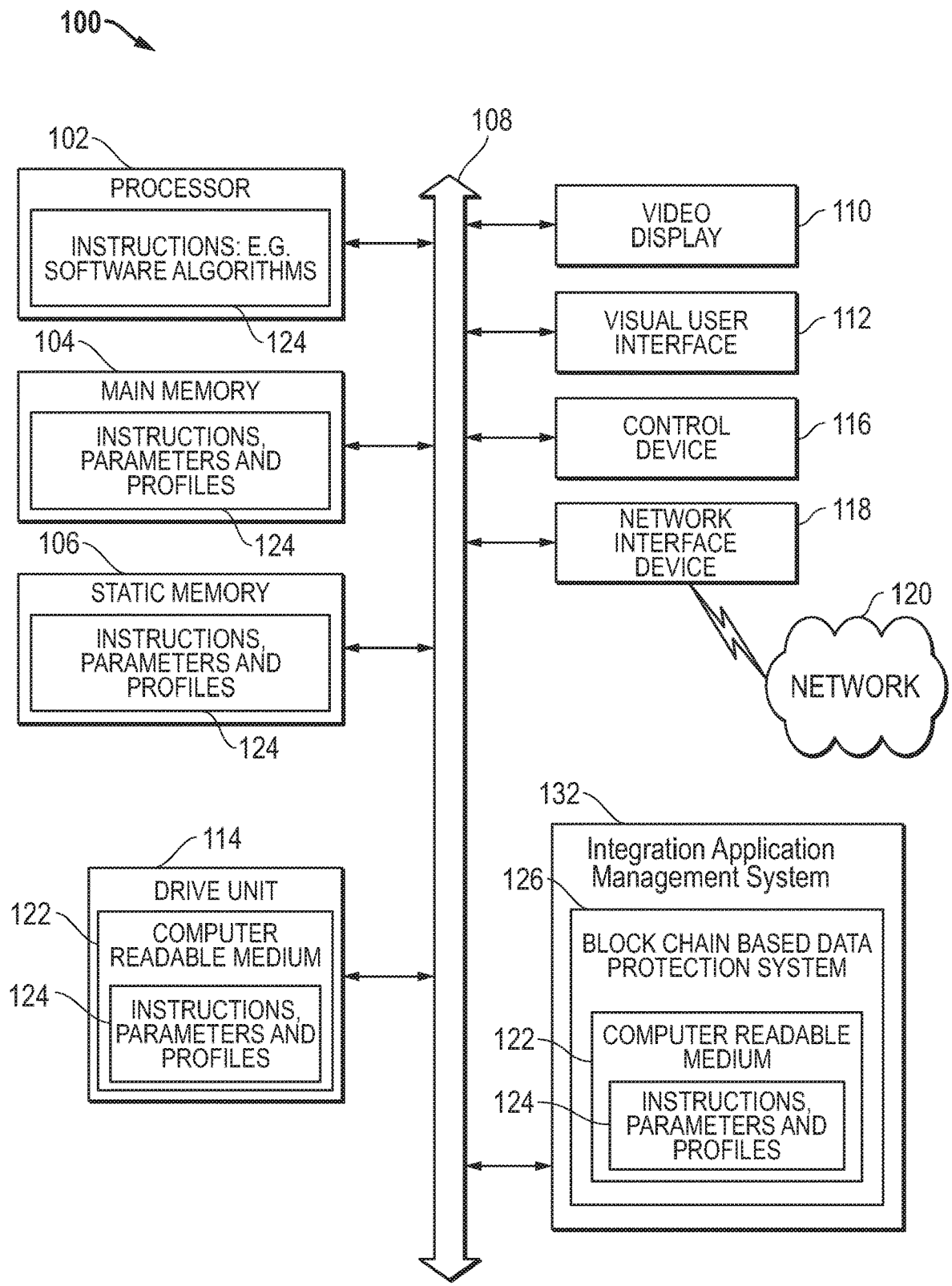
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Conventional software development and distribution models have involved development of an executable software application, and distribution of a computer-readable medium, or distribution via download of the application from the worldwide web to an end user. Upon receipt of the downloaded application, the end user executes installation files to install the executable software application on the user's personal computer (PC), or other information handling system. When the software is initially executed, the application may be further configured/customized to recognize or accept input relating to aspects of the user's PC, network, etc., to provide a software application that is customized for a particular user's computing system. This simple, traditional approach has been used in a variety of contexts, with software for performing a broad range of different functionality. While this model might sometimes be satisfactory for individual end users, it is undesirable in sophisticated computing environments.

Today, most corporations or other enterprises have sophisticated computing systems that are used both for internal operations, and for communicating outside the enterprise's network. Much of present day information exchange is conducted electronically, via communications networks, both internally to the enterprise, and among enterprises. Accordingly, it is often desirable or necessary to exchange information/data between distinctly different computing systems, computer networks, software applications, etc. In many instances, these disparate computing networks, enterprises, or systems are located in a variety of different countries around the world. The enabling of communications between diverse systems/networks/applications in connection with the conducting of business processes is often referred to as "business process integration." In the business process integration context, there is a significant need to communicate between different software applications/systems within a single computing network, e.g. between an enterprise's information warehouse management system and the same enterprise's purchase order processing system. There is also a significant need to communicate between different software applications/systems within different computing networks, e.g. between a buyer's purchase order processing system, and a seller's invoicing system. Some of these different software applications/systems may be cloud-based, with physical servers located in several different countries, cities, or other geographical locations around the world. As data is integrated between and among these cloud-based platforms, datasets may be stored (e.g., temporarily or indefinitely) in some form at physical servers in these various geographical locations.

Relatively recently, systems have been established to enable exchange of data via the Internet, e.g. via web-based interfaces for business-to-business and business-to-consumer transactions. For example, a buyer may operate a PC to connect to a seller's website to provide manual data input to a web interface of the seller's computing system, or in higher volume environments, a buyer may use an executable software application known as EDI Software, or Business-to-Business Integration Software to connect to the seller's computing system and to deliver electronically a business "document," such as a purchase order, without requiring human intervention to manually enter the data. Such software applications are available in the market today. These applications are typically purchased from software vendors and installed on a computerized system owned and maintained by the business, in this example, the buyer. The seller will have a similar/complementary software application on its system, so that the information exchange may be completely automated in both directions. In contrast to the present disclosure, these applications are purchased, installed and operated on the user's local system. Thus, the user typically owns and maintains its own copy of the system, and configures the application locally to connect with its trading partners.

In both the traditional and more recent approaches, the executable software application is universal or "generic" as to all trading partners before it is received and installed within a specific enterprise's computing network. In other words, it is delivered to different users/systems in identical, generic form. The software application is then installed within a specific enterprise's computing network (which may include data centers, etc., physically located outside of an enterprises' physical boundaries). After the generic application is installed, it is then configured and customized for a specific trading partner, after which it is ready for execution to exchange data between the specific trading partner and the enterprise. For example, Walmart® may provide on its website specifications of how electronic data such as Purchase Orders and Invoices must be formatted for electronic data communication with Walmart®, and how that data should be communicated with Walmart®. A supplier/enterprise is then responsible for finding a generic, commercially available software product that will comply with these communication requirements and configuring it appropriately. Accordingly, the software application will not be customized for any specific supplier until after that supplier downloads the software application to its computing network and configures the software application for the specific supplier's computing network, etc. Alternatively, the supplier may engage computer programmers to create a customized data integration process or customized software application to meet these requirements, which is often exceptionally time-consuming and expensive.

Recently, systems and software applications have been established to provide a system and method for on-demand creation of customized data integration processes or customized software applications in which the customization occurs outside of an enterprise's computing network. These software applications and data processes are customized for a specific enterprise before they arrive within the enterprise's computing network, and are delivered to the destination network in customized form. The Dell Boomi® Application is an example of one such software application. With Dell Boomi® and other similar applications, an employee within an enterprise can connect to a website using a specially configured graphical user interface to visually model a customized data integration process via a flowcharting process, using only a web browser interface. During such a modeling process, the user would select from a predetermined set of process-representing visual elements that are stored on a remote server, such as the web server. By way of an example, the customized data integration process could enable a bi-directional exchange of data between internal applications of an enterprise, between internal enterprise applications and external trading partners, or between internal enterprise applications and applications running external to the enterprise.

An integration application management system in an embodiment may allow a user to create a customized data integration software application by modeling a customized data integration process flow using a visual user interface. A modeled customized data integration process flow in embodiments of the present disclosure may model actions taken on data elements pursuant to executable customized data integration code instructions without displaying the code instructions themselves. In such a way, the visual user interface may allow a user to understand the high-level summary of what executable integration code instructions achieve, without having to read or understand the customized data integration code instructions themselves. Similarly, by allowing a user to insert visual elements representing portions of a customized data integration process into the modeled customized data integration process flow displayed on the visual user interface, embodiments of the present disclosure allow a user to identify what she wants executable customized data integration code instructions to achieve without having to write such executable customized data integration code instructions.

Once a user has chosen what she wants an executable customized data integration code instruction to achieve in embodiments herein, the customized data integration code instructions capable of achieving such a task may be generated. Code instructions for achieving a task can be written in any number of languages and/or adhere to any number of standards, often requiring a code writer to have extensive knowledge of computer science and languages. The advent of open-standard formats for writing code instructions that are both human-readable and machine executable have made the writing of code instructions accessible to individuals that do not have a high level knowledge of computer science. Such open-standard, human-readable, data structure formats include extensible markup language (XML) and JavaScript Object Notification (JSON). Because code instructions adhering to these open-standard formats are more easily understood by non-specialists, many companies have moved to the use of code instructions adhering to these formats in constructing their data repository structures and controlling the ways in which data in these repositories may be accessed by both internal and external agents. In order to execute code instructions for accessing data at such a repository during a business integration process, the customized data integration code in some embodiments herein may be written in accordance with the same open-standard formats or other known, or later-developed standard formats.

In addition to the advent of open-standard, human-readable, machine-executable code instructions, the advent of application programming interfaces (APIs) designed using such open-standard code instructions have also streamlined the methods of communication between various software components. An API may operate to communicate with a backend application to identify an action to be taken on a dataset (e.g., a data field name and data field value, or name/value pair) that the backend application manages, or which is being transmitted for management to the backend application. Such an action and convention for identifying the dataset or its location may vary among APIs and their backend applications. For example, datasets may be modeled according to user-supplied definitions. Each dataset may contain a user-defined dataset field name, which may describe a type of information. Each user-defined dataset field name may be associated with a dataset field value. In other words, datasets may be modeled using a field name/value pairing. For example, a dataset for a customer named John Smith may include a first dataset field name "f_name" paired with a first dataset field value "John," and a second dataset field name "l_name" paired with a second dataset field value "Smith." A user in an embodiment may define any number of such dataset field name/value pairs. Other example dataset field names in embodiments may include "dob" to describe date of birth, "ssn" to describe social security number, "phone" to describe a phone number, or "hair," "race," and "reward."

In embodiments described herein, multiple APIs or backend applications accessed via a single integration process may operate according to differing coding languages, dataset structures, dataset field naming conventions or standards. Different coding languages may use different ways of describing routines, data structures, object classes, variables, or remote calls that may be invoked and/or handled during business integration processes that involve dataset field values managed by the backend applications such APIs serve. Thus, a single dataset field value may be described in a single integration process using a plurality of dataset field names, each adhering to the naming conventions set by the APIs, applications, enterprises, or trading partners through or among which the dataset field value is programmed to integrate.

A user interacting with such an API for a backend application may identify such dataset field values based on a description that may or may not include the actual dataset field name of the dataset field value. In some circumstances, a dataset field value may be identified through a search mechanism, or through navigation through a variety of menus, for example. The code sets incorporating the actual dataset field name for the dataset field value may be automatically generated based on this user interaction with an API. In other embodiments, the dataset field value may be identified in a similar way through interaction with the visual integration process flow user interface described herein. For example, the user may create two or more connector visual elements, with each connector element representing a process taken by a different application (e.g., Salesforce™, or NetSuite™). Because each of such connector elements may describe actions taken by a different application, and different applications may adhere to differing code languages, each of a plurality of code sets generated based on these user-generated connector visual elements may be written in a different code language, and may identify dataset field values using different naming conventions, or storage structures. Thus, the code instructions for retrieving a given dataset field value from a first application may describe that dataset field value using a completely different dataset field name than the code instructions for transmitting the same dataset field value to a second application. Further, each integration process in embodiments described herein may involve integration of a single dataset field value (e.g., social security number, name, physical address) through several different APIs, for storage (either temporary, or permanent) at any number of address-identified memory locations throughout the world, and associated with any number of field names (e.g., ssn, f_name, l_name, address). The code instructions generated in accordance with the customized data integration process flow modeled via the user interface in embodiments herein may define the dataset field name associated with a given dataset field value at each of such physical storage locations.

In embodiments described herein, a runtime engine may be created for execution of each of these executable customized data integration code instructions written based on the user-modeled customized data integration process. The runtime engine, and all associated customized data integration code instructions or code sets may be transmitted to an end user for execution at the user's computing device, or enterprise system, and potentially, behind the user's firewall. Because the user does not write the customized data integration code instructions executed by the runtime engine, the user may not know the locations of servers through which the data to be integrated may pass during execution of the runtime engine, or the ways in which dataset field values may be transformed (e.g., given a different dataset field name) therein. As described above, the dataset field values integrated during execution may pass through any number of servers, which may be located in various locations around the world. Further, the contents of these dataset field values may include sensitive personal information (e.g., personal, secure information, or Personal Identity Information as defined within the GDPR), which may not be readily apparent based on the metadata associated with the dataset field values, or the dataset field names given to the dataset field values by various APIs or backend applications involved in the customized data integration process. A method is needed to identify, label, and track the ways in which such sensitive personal information is handled throughout the customized data integration process modeled by the user.

Security of personal information has become an increasing concern of governments and regulatory bodies throughout the world during the 21$^{st}$ century. As an example, the European Union (EU) has recently enacted the General Data Protection Regulation (GDPR), which dictates requirements for processing of personal data of EU individuals, regardless of the geographical location of such processing. In short, enterprises doing business within the EU may be required to adhere to the GDPR, or face stiff fines or penalties. The GDPR contains several provisions requiring controllers of sensitive personal information (e.g., enterprises engaged in data integration processes) to apply appropriate technical and organization measures to implement data protection principles. Further, upon request of an EU citizen whose personal data has been included within an integration process, an adherent to the GDPR (e.g., entity performing data integration processes) must provide adequate explanation of the ways in which such sensitive personal information has been manipulated or transferred.

One way for an enterprise system executing customized data integration processes to protect against infringement involves tracking the content of dataset field values being integrated, and the ways in which such data is being manipulated. For example, an ability to identify sensitive personal information and apply added security measures to customized data integration processes involving such sensitive personal information may lessen the risk of infringement. In embodiments described herein, a block chain based data protection system may track the address-identified memory locations at which a given dataset labeled as containing sensitive personal information has been stored since its creation or initial access pursuant to customized data integration processes modeled via the web-based user interface described herein. When modeling the customized data integration process via the graphical user interface described herein, a user may identify a dataset to be created, read, updated, or deleted at a first location, and potentially a second location to which such a dataset, or a dataset field value within such a dataset may be transmitted. In doing so, the user may also initiate block chain tracking of such a dataset, or the dataset field value, if the dataset is identified as containing potentially sensitive personal information, by inserting a block chain visual element into the visual flow modeling the customized data integration process in embodiments described herein.

The service provider for the graphical user interface through which the user may model the customized data integration process in embodiments described herein may generate machine-readable, executable customized data integration code instructions for the customized data integration process modeled by the user. The service provider may transmit such customized data integration code instructions as well as a runtime engine for remote execution of those code instructions at the user's enterprise network. Such customized data integration code instructions may include commands to transmit an execution log from the user's enterprise network to the service provider, describing one or more aspects of datasets for which the user has initiated block chain tracking pursuant to the visual customized data integration process flow modeled via the graphical user interface. Upon execution of these customized data integration code instructions at the user's enterprise network, and receipt of the execution log at the service provider, the service provider may create a new metadata tracking block associated with these user-identified datasets. Such a metadata tracking block in an embodiment may be associated with one or more dataset field names describing a single dataset field value created, read, updated, or deleted pursuant to a step within an executed customized data integration process. As such, each metadata tracking block may be associated with a single execution of a customized data integration process, but each execution of a single customized data integration process may be associated with multiple metadata tracking blocks. Further, later executions of the same customized data integration process may also result in creation of new metadata tracking blocks associated with the same dataset field value. Each of these metadata tracking blocks, generated at multiple steps within the execution of a single customized data integration process, or generated pursuant to multiple executions of a customized data integration process, may be linked together to form a block chain describing each of the locations at which a single dataset field value has been stored. Such block chains may be stored at the system provider or a cloud-based storage location managed by the system provider, and may be searched by dataset field value, or by another metadata search term provided by the user.

A block chain in an embodiment may include a growing list of records in the form of metadata blocks that are cryptographically linked to one another. Each block within a block chain may contain a cryptographic hash of the previous block, along with the recorded metadata described directly above. Anyone can add a new block, each block within a block chain may be publicly available, and multiple copies of each block chain may exist in multiple locations (e.g., nodes within a decentralized peer-to-peer network). In some scenarios, a new block may be added to one version of a given block chain, but not added to another version of the same block chain, resulting in two nodes having different version of the same block chain. In such a scenario, a single block chain may develop a fork, or two different histories of transactions. Each block chain is equipped with an algorithm for scoring multiple histories in order to address such inconsistencies. For example, a single node within the peer-to-peer network may receive each of the two different versions of the given block chain described above, and may only keep the version associated with the highest score. As the multiple versions circulate throughout the many nodes of the peer-to-peer network, and nodes discard lower scoring versions, the "correct" or most reliable version of the block chain is selected over time by majority decision of the nodes within the network through which the multiple versions are circulating.

One way in which a fork may appear, resulting in two different versions of the block chain, occurs when an attempt is made to alter or corrupt information stored within a previously recorded block, rather than adding a new block to the block chain. Because each block recorded after the corrupted block contains a hash of the corrupted block, the newer blocks will not match the earlier block. Thus, the only way to alter information stored in a previously recorded block is to alter information stored in every succeeding block as well. However, such an alteration of multiple blocks may only alter a single version of the many versions of the same block chain circulating throughout the many nodes of the peer-to-peer network. The chances that a single, significantly altered version of the block chain will receive the highest score, and thus be designated through majority consensus as the most reliable version, are vanishingly small. Thus, the decentralized, public, cryptographic linking structure of block chains provide a substantially immutable record of each transaction recorded within each block.

The block chains described in embodiments herein may thus store an immutable record for each location at which a single dataset field value has been stored over time, even if the dataset field name describing that dataset field value has changed over time. For example, a single block chain in embodiments described herein may be associated with a dataset field value "123-45-6789" (e.g., social security number). Such a block chain may also be associated with two separate dataset field names (e.g., "SSN," and "social_security_number") under which the social security number "123-45-6789" was stored by two separate APIs, pursuant to a single customized data integration process modeled via the graphical user interface. The block chain based data protection system in embodiments described herein may track the movement of such a dataset field value throughout the customized data integration process in such a way to assist with the type of reporting required by the GDPR. As described herein, because multiple steps within the customized data integration process may be executed using different coding languages, the code instructions for retrieving a given dataset field value from a first application/location/enterprise may describe that dataset field value using a completely different dataset field name than the code instructions for storing the same dataset field value at a second application/location/enterprise. Thus, even after a first dataset is identified at a given step of such a customized data integration process as including a dataset field value containing potentially sensitive personal information, a method is needed to also identify other datasets also including the same dataset field value as containing potentially sensitive personal information.

Embodiments of the present disclosure address this issue by creating and referencing a block chain tracking physical storage locations for each dataset field value identified as containing potentially sensitive personal information, and each dataset field name associated therewith at each recorded physical storage location. Users executing customized data integration processes for creation, reading, updating, or deletion of datasets containing such potentially sensitive personal information may request a report of known physical storage locations for a given dataset field value over time, pursuant to such executed customized data integration processes in embodiments. For example, such reporting may assist in deterring or lessening potential fines if an infringement of the GDPR should occur.

Failure to comply with the GDPR may result in hefty fines. The level of fine levied against a non-compliant entity is determined according to a variety of factors, that include the extent of the infringement (e.g., number of people affected and damage caused thereto), mitigating acts taken by the non-compliant entity following infringement, preventative measures taken by the non-compliant entity prior to the infringement, what types of data were impacted by the infringement, and whether the non-compliant entity promptly notified those who were affected by the infringement, among others. In the unfortunate event of an infringement, enterprises executing customized data integration processes may at least decrease the amount of the resultant penalties by providing detailed metrics describing data affected by each customized data integration process, individuals whose information was incorporated within such data, and the ways in which such data was accessed, copied, transferred, or otherwise manipulated in an infringing customized data integration process. Such detailed information may indicate preventative and mitigating measures were taken, and may assist in notification of individuals impacted. Further, providing a tangible number of individuals impacted may avoid an assumption of a much higher number of victims and damages caused thereto.

A service provider receiving a user reporting instruction requesting reporting for a specifically identified dataset field value in embodiments described herein may access the stored block chain associated with the user-specified dataset field value. The service provider may then generate a tracking report detailing each of the address-identified memory locations at which the user-identified dataset field value has been stored, and the dataset field name associated with that dataset field value at each of these address-identified memory locations. In some embodiments described herein, a user may further transmit a user deletion instruction requesting removal of such dataset field values at one or more of such known physical storage locations. For example, if an employee leaves a position with the user, the user may wish to remove all potentially sensitive personal information associated with that employee at each address-identified memory location under the control of the user/employer. The user/employer in some embodiments may identify one or more dataset field values associated with the ex-employee within a user deletion instruction transmitted to the service provider, and the service provider may automatically initiate a deletion process for deletion of each of these identified dataset field values, at each address-identified memory location identified within the block chains associated with each of these identified dataset field values. In such a way, the block chain based data protection system in embodiments may enable users to comply with GDPR requirements.

FIG. 1 is a block diagram illustrating an information handling system, according to an embodiment of the present disclosure. Information handling system 100 can include processing resources for executing machine-executable code, such as a central processing unit (CPU), a programmable logic array (PLA), an embedded device such as a System-on-a-Chip (SoC), or other control logic hardware used in an information handling system several examples of which are described herein. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules herein, and operates to perform one or more of the methods. The information handling system 100 may execute code 124 for the block chain based data protection system 126, or the integration application management system 132 that may operate on servers or systems, remote data centers, or on-box in individual client information handling systems such as a local display device, or a remote display device, according to various embodiments herein. In some embodiments, it is understood any or all portions of code 124 for the block chain based data protection system 126 or the integration application management system 132 may operate on a plurality of information handling systems 100.

The information handling system 100 may include a processor 102 such as a central processing unit (CPU), a graphics-processing unit (GPU), control logic or some combination of the same. Any of the processing resources may operate to execute code that is either firmware or software code. Moreover, the information handling system 100 can include memory such as main memory 104, static memory 106, drive unit 114, or the computer readable medium 122 of the block chain based data protection system 126, or the integration application management system 132 (volatile (e.g. random-access memory, etc.), nonvolatile (read-only memory, flash memory etc.) or any combination thereof). Additional components of the information handling system can include one or more storage devices such as static memory 106, drive unit 114, and the computer readable medium 122 of the block chain based data protection system 126, or the integration application management system 132. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110, such as a liquid crystal display (LCD), an organic light emitting diode (OLED), a flat panel display, a solid state display, or other display device. Additionally, the information handling system 100 may include a control device 116, such as an alpha numeric control device, a keyboard, a mouse, touchpad, fingerprint scanner, retinal scanner, face recognition device, voice recognition device, or gesture or touch screen input.

The information handling system 100 may further include a visual user interface 112. The visual user interface 112 in an embodiment may provide a visual designer environment permitting a user to define process flows between applications/systems, such as between trading partner and enterprise systems, and to model a customized business integration process. The visual user interface 112 in an embodiment may provide a menu of pre-defined user-selectable visual elements and permit the user to arrange them as appropriate to model a process and may be displayed on the video display 110. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc.

Further, the graphical user interface 112 allows the user to provide user input providing information relating to trading partners, activities, enterprise applications, enterprise system attributes, and/or process attributes that are unique to a specific enterprise end-to-end business integration process. For example, the graphical user interface 112 may provide drop down or other user-selectable menu options for identifying trading partners, application connector and process attributes/parameters/settings, etc., and dialog boxes permitting textual entries by the user, such as to describe the format and layout of a particular dataset to be sent or received, for example, a Purchase Order. The providing of this input by the user results in the system's receipt of such user-provided information as an integration process data profile code set.

In some embodiments, the graphical user interface 112 may also allow a user to provide one or more search terms that may be used to identify dataset field values affected by one or more integration processes that are likely to include sensitive personal information. A user in such an embodiment may interact with such a user interface 112 to include or exclude terms used by the block chain based data protection system 124 to track address-identified memory locations at which datasets identified by the user as containing potentially sensitive personal information may be stored pursuant to one or more customized data integration processes. Address-identified memory locations, as referred to herein, include any memory location for storage of data, including locations defined by physical, logical, or virtual memory addresses. In yet another embodiment, a user may employ the graphical user interface 112 to search and view information describing such potentially sensitive dataset field values identified in such a manner.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 114, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive unit 114 or in a storage system (not illustrated) associated with network interface device 118 or any combination thereof. Application programs 124, and BIOS/FW code 124 can each be implemented as single programs, or as separate programs carrying out the various features as described herein. Application program interfaces (APIs) such as WinAPIs (e.g. Win32, Win32s, Win64, and WinCE), or an API adhering to a known open source specification may enable application programs 124 to interact or integrate operations with one another.

In an example of the present disclosure, instructions 124 may execute software for tracking and reporting information describing dataset field values accessed, transferred, copied, or otherwise manipulated during a customized data integration process, for compliance with governmental regulations. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The disk drive unit 114, the integration application management system 132, and the block chain based data protection system 126 may include a computer-readable medium 122 such as a magnetic disk, or a solid-state disk in an example embodiment. The computer-readable medium of the memory, storage devices and the block chain based data protection system 104, 106, 114, 132 and 126 may store one or more sets of instructions 124, such as software code corresponding to the present disclosure.

The disk drive unit 114, static memory 106, and computer readable medium 122 of the block chain based data protection system 126, or the integration application management system 132 may also contain space for data storage such as an information handling system for managing locations of executions of customized integration processes in endpoint storage locations. Connector code sets (e.g., customized data integration code instructions, deletion code instructions, archive code instructions, or notification code instructions), and trading partner code sets may also be stored in part in the disk drive unit 114, static memory 106, or computer readable medium 122 of the block chain based data protection system 126, or the integration application management system 132 in an embodiment. In other embodiments, data profile code sets, and runtime engines may also be stored in part or in full in the disk drive unit 114, static memory 106, or computer readable medium 122 of the block chain based data protection system 126, or the integration application management system 132. Further, the instructions 124 of the block chain based data protection system 126, or the integration application management system 132 may embody one or more of the methods or logic as described herein.

In a particular embodiment, the instructions, parameters, and profiles 124, and the block chain based data protection system 126, or the integration application management system 132 may reside completely, or at least partially, within the main memory 104, the static memory 106, disk drive 114, and/or within the processor 102 during execution by the information handling system 100. Software applications may be stored in static memory 106, disk drive 114, and the block chain based data protection system 126, or the integration application management system 132.

Network interface device 118 represents a NIC disposed within information handling system 100, on a main circuit board of the information handling system, integrated onto another component such as processor 102, in another suitable location, or a combination thereof. The network interface device 118 can include another information handling system, a data storage system, another network, a grid management system, another suitable resource, or a combination thereof.

The block chain based data protection system 126 and the integration application management system 132 may also contain computer readable medium 122. While the computer-readable medium 122 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the block chain based data protection system 126, and the integration application management system 132. The block chain based data protection system 126, and the integration application management system 132 may be operably connected to the bus 108. The block chain based data protection system 126 and the integration application management system 132 are discussed in greater detail herein below.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, or module can include software, including firmware embedded at a device, such as an Intel® Core class processor, ARM® brand processors, Qualcomm® Snapdragon processors, or other processors and chipset, or other such device, or software capable of operating a relevant environment of the information handling system. The system, device or module can also include a combination of the foregoing examples of hardware or software. In an example embodiment, the block chain based data protection system 126, and the integration application management system 132 above and the several modules described in the present disclosure may be embodied as hardware, software, firmware or some combination of the same. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
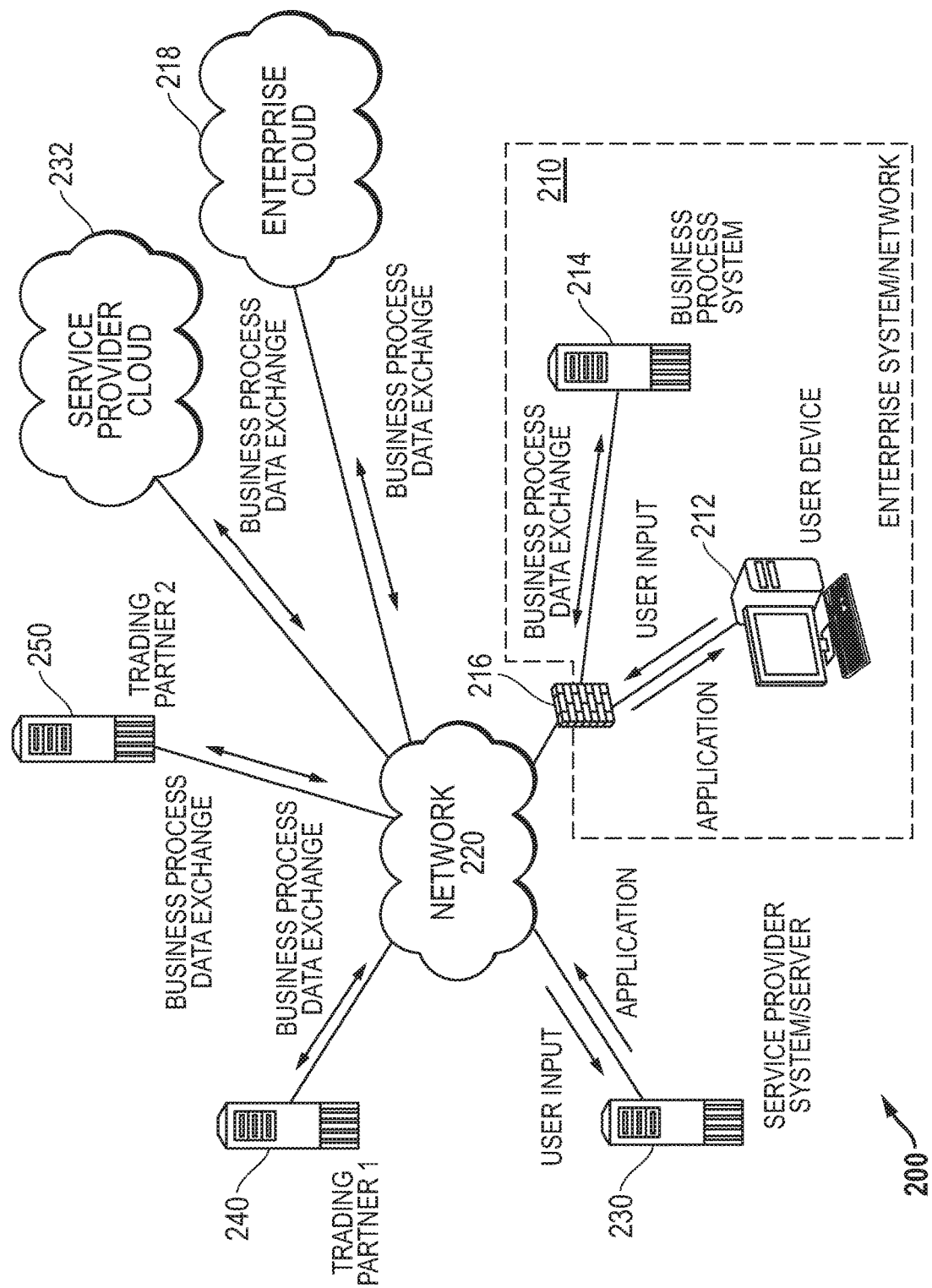
FIG. 2 is a block diagram illustrating a simplified integration network according to an embodiment of the present disclosure.

FIG. 2 is a graphical diagram illustrating a simplified integration network 200 including a service provider system/server 230 and an enterprise system/network 210 in an embodiment according to the present disclosure. Actual integration network topology could be more complex in some other embodiments. As shown in FIG. 2, an embodiment may include conventional computing hardware of a type typically found in client/server computing environments. More specifically, the integration network 200 in an embodiment may include a conventional user/client device 212, such as a conventional desktop or laptop PC, enabling a user to communicate via the network 220, such as the Internet. In another aspect of an embodiment, the user device 212 may include a portable computing device, such as a computing tablet, or a smart phone. The user device 212 in an embodiment may be configured with conventional web browser software, such as Google Chrome®, Firefox®, or Microsoft Corporation's Internet Explorer® for interacting with websites via the network 220. In an embodiment, the user device 212 may be positioned within an enterprise network 210 behind the enterprise network's firewall 216, which may be of a conventional type. As a further aspect of an embodiment, the enterprise network 210 may include a business process system 214, which may include conventional computer hardware and commercially available business process software such as QuickBooks, SalesForce's™ Customer Relationship Management (CRM) Platform, Oracle's™ Netsuite Enterprise Resource Planning (ERP) Platform, Infor's™ Warehouse Management Software (WMS) Application, or many other types of databases.

In an embodiment, the integration network 200 may further include trading partners 240 and 250 operating conventional hardware and software for receiving and/or transmitting data relating to business-to-business transactions. For example, Walmart® may operate trading partner system 240 to allow for issuance of purchase orders to suppliers, such as the enterprise 210, and to receive invoices from suppliers, such as the enterprise 210, in electronic data form as part of electronic data exchange processes. Electronic data exchange process in an embodiment may include data exchange via the world wide web. In other embodiments, electronic data exchange processes may include data exchange via FTP or SFTP.

In an embodiment, a provider of a service ("service provider") for creating on-demand, real-time creation of customized data integration software applications may operate a service provider server/system 230 within the integration network 200. The service provider system/server 230 may be specially configured in an embodiment, and may be capable of communicating with devices in the enterprise network 210. The service provider system/server 230 in an embodiment may host a customized data integration process-modeling user interface in an embodiment. Such a customized data integration process-modeling user interface may allow a user or the block chain based data protection system to model a customized data integration process including one or more sub-processes for data integration through a business process data exchange between an enterprise system/network 210 and outside entities or between multiple applications operating at the business process system 214. The customized data integration process modeled in the integration process-modeling user interface in an embodiment may be a single business process data exchange shown in FIG. 2, or may include several business process data exchanges shown in FIG. 2. For example, the enterprise system/network 210 may be involved in a business process data exchange via network 220 with a trading partner 1, and/or a trading partner 2. In other example embodiments, the enterprise system/network 210 may be involved in a business process data exchange via network 220 with a service provider located in the cloud 232, and/or an enterprise cloud location 218. For example, one or more applications between which a dataset field value may be transferred, according to embodiments described herein, may be located remotely from the enterprise system 210, at a service provider cloud location 232, or an enterprise cloud location 218.

The block chain based data protection system, or a user of an integration process-modeling user interface in an embodiment may model one or more business process data exchanges via network 220 within a customized data integration process by adding one or more visual connector integration elements or code sets to an customized data integration process flow. These visual connector integration elements in an embodiment may model the ways in which a user wishes data to be accessed, moved, and/or manipulated during the one or more business process data exchanges. Each visual connector element the user adds to the customized data integration process flow diagram in an embodiment may be associated with a pre-defined subset of customized data integration code instructions stored at the service provider systems/server 230 in an embodiment. Upon the user modeling the customized data integration process, the service provide system/server 230 in an embodiment may generate a runtime engine capable of executing the pre-defined subsets of customized data integration code instructions represented by the visual connector integration elements chosen by the user. The runtime engine may then execute the subsets of customized data integration code instructions in the order defined by the modeled flow of the visual connector integration elements given in the customized data integration process flow diagram. In such a way, a customized data integration process may be executed without the user having to access, read, or write the code instructions of such a customized data integration process.

In other aspects of an embodiment, a user may initiate a business process data exchange between one cloud service provider 232 and one cloud enterprise 218, between multiple cloud service providers 232 with which the enterprise system 210 has an account, or between multiple cloud enterprise accounts 218. For example, enterprise system 210 may have an account with multiple cloud-based service providers 232, including a cloud-based SalesForce™ CRM account and a cloud-based Oracle™ Netsuite account. In such an embodiment, the enterprise system 210 may initiate business process data exchanges between itself, the SalesForce™ CRM service provider and the Oracle™ Netsuite service provider.

In some embodiments, a single customized data integration process may involve movement of dataset field values among several different entities, in series. For example, a dataset field value may travel via network 220 from the enterprise system 210, to enterprise cloud 218, then cloud service provider 232, and ultimately to trading partner 240. A dataset field value may move, undergoing temporary or permanent storage or other manipulations, through potentially hundreds of such different address-identified memory locations, at potentially hundreds of geographic locations within a single customized data integration process in some embodiments.

Figure 3A:
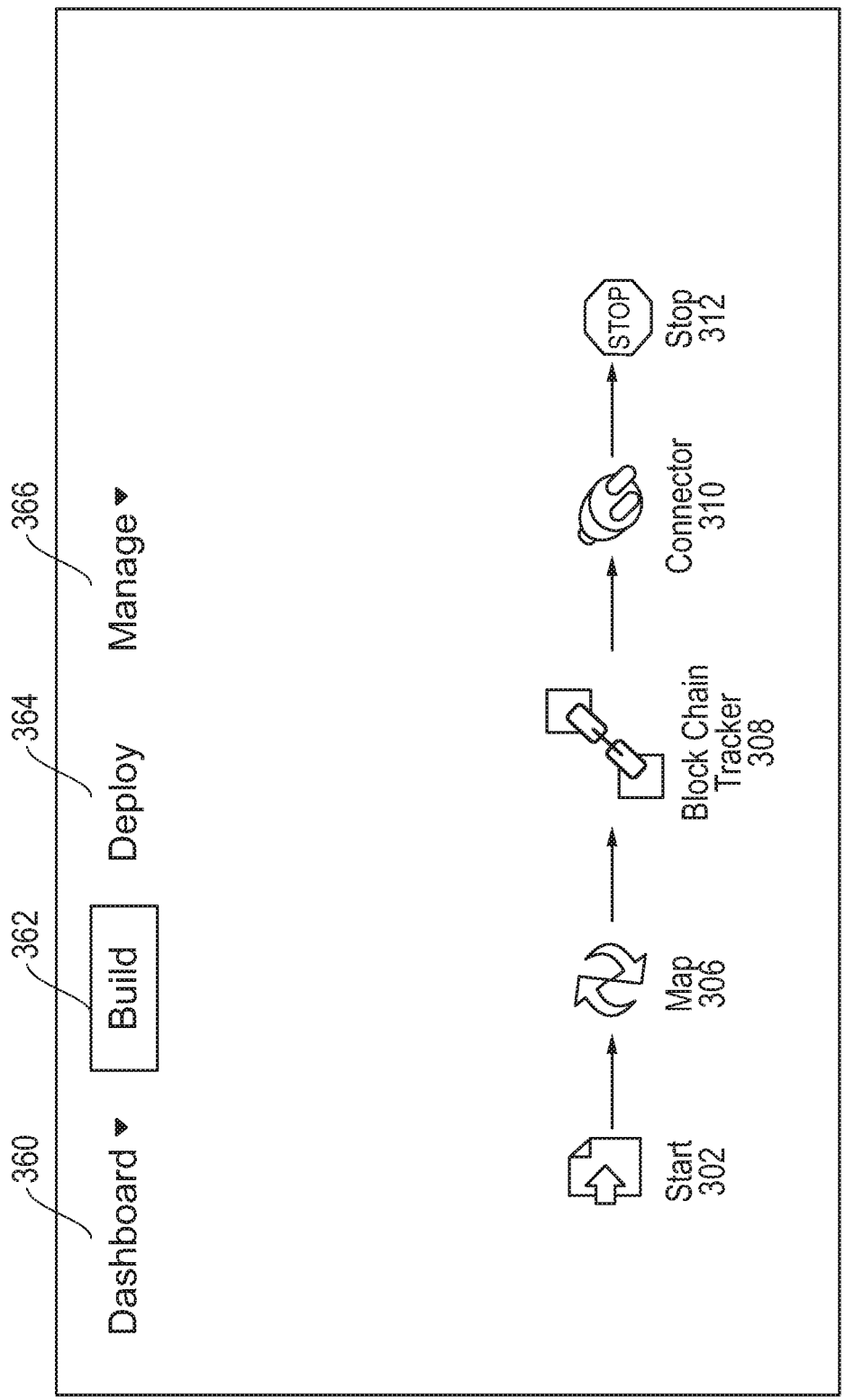
FIG. 3A is a graphical diagram illustrating a user-generated flow diagram of a customized data integration process according to an embodiment of the present disclosure.

FIG. 3A is a graphical diagram illustrating a user-generated flow diagram of a customized data integration process for exchange of electronic data records according to an embodiment of the present disclosure. The flow diagram in an embodiment may be displayed within a portion of a graphical user interface that allows the user to build the process flow, deploy the customized data integration process modeled thereby (e.g., by selecting the deploy tab 364), manage dataset field values manipulated by such a customized data integration process (e.g., by selecting the manage tab 366), and to view high-level metrics associated with execution of such a customized data integration process (e.g., by selecting the dashboard tab 360). The user may build the process flow and view previously built process flow diagrams by selecting the "Build" tab 362 in an embodiment. A user may generate a flow diagram in an embodiment by providing a chronology of process-representing integration elements via the use of an integration process-modeling user interface. In some embodiments, the integration process-modeling user interface may take the form of a visual user interface. In such embodiments, the user-selectable elements representing integration sub-processes (e.g. connector integration elements) may be visual icons.

An integration process-modeling user interface in an embodiment may provide a design environment permitting a user to define process flows between applications/systems, such as between trading partner and enterprise systems, between on-site data centers and cloud-based storage modules, or between multiple applications, and to model a customized data integration process. Such an integration process-modeling user interface in an embodiment may provide a menu of pre-defined user-selectable elements representing integration sub-processes and permit the user or the block chain based data protection system to arrange them as appropriate to model a full, customized data integration process. For example, in an embodiment in which the integration process-modeling user interface is a visual user interface, the elements may include visual, drag-and-drop icons representing specific units of work (known as process components) required as part of the customized data integration process. Such process components in an embodiment may include invoking an application-specific connector to access, and/or manipulate data. In other embodiments, process components may include tasks relating to transforming data from one format to another, routing data down multiple paths of execution by examining the contents of the data, business logic validation of the data being processed, etc.

Each process component as represented by integration sub-process icons or elements may be identifiable by a process component type, and may further include an action to be taken. For example, a process component may be identified as a "connector" component. Each "connector" component, when chosen and added to the process flow in the integration process-modeling user interface, may allow the block chain based data protection system or a user to choose from different actions the "connector" component may be capable of taking on the data as it enters that process step. Further the integration-process modeling user interface in an embodiment may allow the user to choose the dataset upon which the action will be taken. The action and dataset the user chooses may be associated with a connector code set, via the integration application management system, which may be pre-defined and stored at a system provider's memory in an embodiment. The integration application management system operating at least partially at a system provider server/system in an embodiment may generate a dynamic runtime engine for executing these pre-defined subsets of code instructions correlated to each individual process-representing visual element (process component) in a given flow diagram in the order in which they are modeled in the given flow diagram, or by the block chain based data protection system in a non-visual format.

In an embodiment, a user may choose a process component it uses often when interfacing with a specific trade partner or application, and define the parameters of that process component by providing parameter values specific to that trading partner or application. If the user wishes to use this process component, tailored for use with that specific trading partner or application repeatedly, the user may save that tailored process component as a trading partner or component named specifically for that application. For example, if the user often accesses NetSuite™ or SalesForce™, the user may create a database connector process component, associated with a pre-built connector code set that may be used with any database, then tailor the database connector process component to specifically access NetSuite™ or SalesForce™ by adding process component parameters associated with one of these applications. If the user uses this process component in several different integration processes, the user may wish to save this process component for later use by saving it as a NetSuite™ or SalesForce™ process component. In the future, if the user wishes to use this component, the user may simply select the NetSuite™ or SalesForce™ component, rather than repeating the process of tailoring a generic database connector process component with the specific parameters defined above.

As shown in FIG. 3A, such process-representing visual elements may include a start element 302, a message element 304, a map element 306, a block chain tracking element 308, a connector element 310, and a stop element 312. Other embodiments may also include a branch element, a decision element, a data process element, or a process call element, for example. A connector element 310, and a start element 302 in an embodiment may represent a sub-process of a customized data integration process describing the accessing and/or manipulation of data. The start element 302 in an embodiment may also operate as a connector element.

In an embodiment, a start element 302 may operate to begin a customized data integration process flow, and a stop element 312 may operate to end a customized data integration process flow. As discussed above, each visual element may require user input in order for a particular enterprise or trading partner to use the resulting process. The start element 302 in an embodiment may further allow or require the user to provide data attributes unique to the user's customized data integration process, such as, for example, the source of incoming data to be integrated. For example, the user may use a connector element to define a connection (e.g., an application managing a dataset upon which action is to be taken), and the action to be taken. A user may use a connector element to further define a location of such a dataset, according to the language and storage structure understood by the application managing such a dataset. In addition, the dataset to be accessed according to such a start element 302 may be identified by a dataset field name given in a format that adheres to the code language and storage structure used by the application/location/enterprise at which such a dataset may be accessed.

A map element 306, or TransformMap element in an embodiment may associate a first dataset field name for a dataset field value being retrieved from a first application or source with a second dataset field name under which that dataset field value will be stored at a second application or destination. A user may also provide an operation name that describes the purpose for changing the dataset field names of the dataset field value in such a way. Because a single customized data integration process may transmit dataset field values between or among several sources and destinations, a process flow may include several of these mapping elements 306, sometimes placed in series with one another. This may result in a single dataset field value receiving several different dataset field names as it moves from various sources to various destinations throughout the customized data integration process.

The customized data integration code sets associated with the visual elements 302, 304, 306, 308, 310, and 312, including those associated with the connection location and action to be taken within a connector element may be written in any programming code language so long as they are consistent with one another. Thus, the process-representing elements in an embodiment may be programming language-agnostic. Using such process-representing elements in an embodiment, a user may model an end-to-end customized data integration process between multiple applications that each use different naming conventions and storage structures for storage of dataset field values. As a result, a single dataset field value accessed at the start element 302 and transmitted to a second location at the connector element 310 in an embodiment may be identified at the start element 302 with a completely different dataset field name (e.g., "Social_Security_Number") than the dataset field name (e.g., "SSN") used to identify the exact same dataset field value at the connector element 310.

Figure 3B:
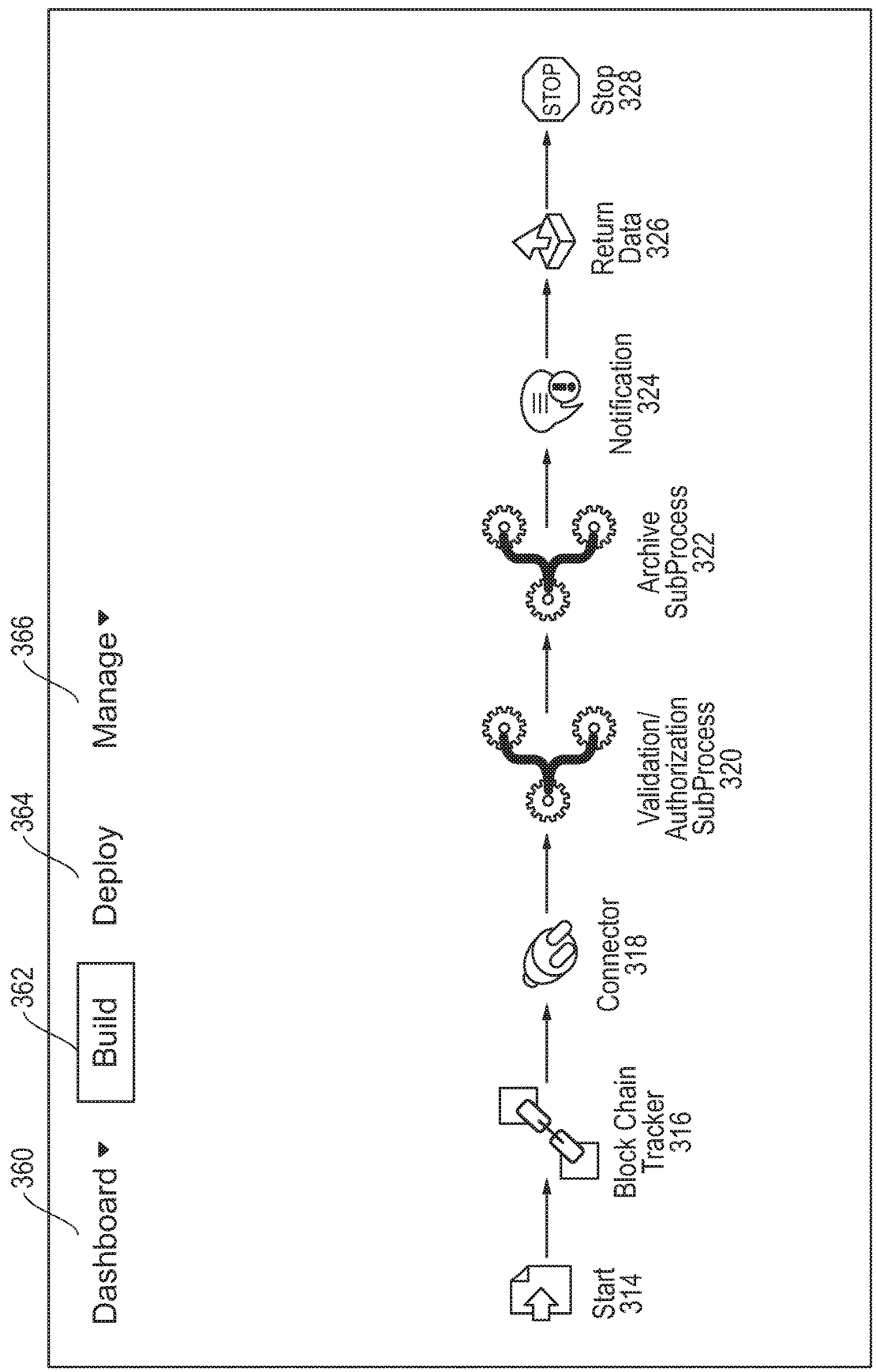
FIG. 3B is a graphical diagram illustrating a user-generated flow diagram of a deletion process for electronic data records according to an embodiment of the present disclosure.

If a user anticipates a modeled customized data integration process may access, copy, transmit, or otherwise manipulate a dataset field value likely to include sensitive personal information (e.g., personal information protected under the GDPR), the user may provide a user block chain instruction by inserting a block chain tracking visual element 308 identifying such dataset field values within the modeled customized data integration process flow. Such a user block chain instruction may result in the generation of a block containing metadata describing the address-identified memory location at which the dataset field value likely to include sensitive personal information is stored, pursuant to the integration process modeled within the process flow of FIG. 3B. If the integration process modeled in FIG. 3B results in this dataset field value being stored at multiple locations, multiple blocks may be created, with each block describing one of the multiple locations at which the dataset field value has been stored. Similarly, if the integration process modeled in FIG. 3B is executed multiple times, multiple blocks may be created, with each block describing one of the times at which the integration process was executed to store the dataset field value at the same or different locations. Each of these multiple blocks in an embodiment may be cryptographically linked to one another to form a block chain, which may be stored at one of a plurality of nodes (e.g., separate physical, logical, or virtual locations within memory for one or more servers or information handling systems within a peer-to-peer network).

As described herein, each block within such a block chain may contain a cryptographic hash of the previous block, along with the recorded metadata described directly above. Anyone can add a new block, each block within a block chain may be publicly available in some examples or otherwise available within a particular enterprise, and multiple copies of each block chain may exist in multiple locations (e.g., nodes within a decentralized peer-to-peer network). In some scenarios, a new block may be added to one version of a given block chain, but not added to another version of the same block chain, resulting in two nodes having different version of the same block chain. In such a scenario, a single block chain may develop a fork, or two different histories of transactions. Each block chain is equipped with an algorithm for scoring multiple histories in order to address such inconsistencies. For example, a single node within the peer-to-peer network may receive each of the two different versions of the given block chain described above, and may only keep the version associated with the highest score. As the multiple versions circulate throughout the many nodes of the peer-to-peer network, and nodes discard lower scoring versions, the "correct" or most reliable version of the block chain is selected over time by majority decision of the nodes within the network through which the multiple versions are circulating.

One way in which a fork may appear, resulting in two different versions of the block chain, occurs when an attempt is made to alter or corrupt information stored within a previously recorded block, rather than adding a new block to the block chain. Because each block recorded after the corrupted block contains a hash of the corrupted block, the newer blocks will not match the earlier block. Thus, the only way to alter information stored in a previously recorded block is to alter information stored in every succeeding block as well. However, such an alteration of multiple blocks may only alter a single version of the many versions of the same block chain circulating throughout the many nodes of the peer-to-peer network. The chances that a single, significantly altered version of the block chain will receive the highest score, and thus be designated through majority consensus as the most reliable version, are vanishingly small. Thus, the decentralized, cryptographic linking structure of block chains provide a substantially immutable record of each transaction recorded within each block. In embodiments herein, the block chain system may be utilized to provide a substantially immutable record of status and activity relating to potentially sensitive personal information as handled or managed by an automated integration process.

Returning to FIG. 3A, a user may identify a dataset field value that she wishes to track using block chain technology in an embodiment, by directly identifying the dataset field value, or through a search for specific terms within metadata associated with datasets. Upon insertion of the block chain tracking visual element 308 into the integration flow shown in FIG. 3A in an embodiment, a user may be prompted to provide such user-specified search terms to be used to identify datasets being integrated by the modeled customized data integration process that may contain potentially sensitive personal information or to identify such datasets by a specific dataset field value. The user may further define one or more search terms that may be used to locate the metadata tracking block chain for that dataset in the future, via the graphical visual user interface. For example, the user may identify a dataset field value "xxx-xx-xxxx" (e.g., representing a social security number) via the block chain tracking visual element 308 by directly entering this value, then provide search terms such as "social_security_number," or "SSN" that may be used in the future to locate the block chain for tracking a specific dataset field value or any dataset field value falling under the search term (i.e., a specific social security number or all social security numbers depending on the search context). In some embodiments, Boolean search operations may be supported, such that the user may locate block chains associated with multiple search terms. In these embodiments, the user may associate the dataset field value for a specific social security number "123-45-6789" with a search term "social_security_number" that identifies the dataset field name associated with the dataset field value within the dataset, as well as the search terms "John Doe" and "employee_name" identifying the a field value "John Doe" for the field name "employee_name" associated with this social security number in another dataset. In such a way, the user may use the graphical visual user interface to define a dataset field value to be tracked using block chain, as well as multiple search terms for locating such a block chain after the integration process has been executed. By defining the dataset field value or by providing user-specified search terms in such a way, the user may be said to have identified one or more datasets containing sensitive personal information.

In other example embodiments, a user may provide such user-specified search terms to be used to identify datasets containing potentially sensitive personal information, such as medical data. For example, the user may identify a dataset field value associated with a dataset field name "BP" or "blood_pressure," via the block chain tracking visual element 308 by directly entering this value, then provide search terms such as "BP," or "blood pressure" that may be used in the future to locate the block chain for tracking this dataset field value. As another example, the user may identify a dataset field value associated with a dataset field name "height," by directly entering this value, then provide search terms such as "height" that may be used in the future to locate the block chain for tracking this dataset field value. As yet another example, the user may identify a dataset field value associated with a dataset field name "weight," by directly entering this value, then provide search terms such as "weight" that may be used in the future to locate the block chain for tracking this dataset field value.

The block chain tracking visual element 308 in such an embodiment may be associated with code instructions directing creation of an execution log that includes metadata associated with such identified datasets, including the address-identified memory locations at which the dataset is stored pursuant to the modeled customized data integration process during later executions thereof, as well as the dataset field names under which such identified dataset field values are stored at those address-identified memory locations. Such code instructions may further include a command to transmit the generated execution log with such metadata from the remote location at which the customized data integration process is later executed to the service provider managing the customized data integration process-modeling user interface shown in FIG. 3A.

FIG. 3B is a graphical diagram illustrating a user-generated flow diagram of a deletion process providing automatic deletion of electronic data records containing personal information from one or more storage locations according to an embodiment of the present disclosure. As described herein, a user may request removal dataset field values identified as potentially containing sensitive personal information at one or more known storage locations. For example, if an employee leaves a position with the user, the user may wish to remove all potentially sensitive personal information associated with that employee at each address-identified memory location under the control of the user/employer. The user/employer in some embodiments may identify one or more dataset field values associated with the ex-employee to the service provider. The service provider in such an embodiment may automatically create a new process flow for deletion of the user-identified dataset field values at each location identified within the block chains associated with each identified dataset field value. In such a way, the block chain based data protection system in embodiments may enable users to comply with GDPR requirements or to remove all sensitive personal information relating to specific individuals, such as when that individual no longer participates in the enterprise system storing such information. In other embodiments, the block chain based data protection system in embodiments may enable users to comply with GDPR requirements or to remove all sensitive personal information that may have been manipulated or utilized within an integration process but must be removed or tracked relating to any individuals or a subset of individuals, such as when one or more database locations or entity-controlled locations are no longer participating or entitled to maintain such information in relation to the enterprise system operating a business integration that stores such information at such a database location.

Upon identification of dataset field values potentially containing sensitive personal information in an embodiment, the block chain based data protection system may generate a data deletion process flow that models deletion of data identified within block chains generated pursuant to the customized data integration process modeled in FIG. 3A. For example, the data deletion process flow modeled in FIG. 3B may be generated automatically by the block chain based data protection system upon user input identifying one or more dataset field values that should be deleted. As shown in FIG. 3B, such a data deletion process flow may include a start element 314, a block chain tracking element 316, a connector element 318, a validation/authorization sub-process element 320, an archive sub-process element 322, a notification element 324, a return data element 326, and a stop element 328.

As discussed above, the start element 314 in an embodiment may allow or require the user or the block chain based data protection system to provide data attributes unique to the user's specific customized data integration process, such as, for example, the source of data to be deleted. As also described herein, the user may identify one or more datasets for deletion by providing a user-specified search term. The block chain based data protection system in such an embodiment may receive this user-specified search term and search the block chains generated pursuant to the block chain tracker visual element 308 depicted in FIG. 3A for matching blocks. For example, a user may provide a user-specified search term "social," which may match a block describing storage at a first location (e.g., Netsuite™) of a dataset field name "social_security_number," having a dataset field value "123-45-6789." In other embodiments, the user may provide a dataset field value for removal rather than a search term. In such embodiments, the block chain based data protection system may retrieve several blocks within a block chain, all of which may be associated with the user-specified dataset field value.

In other example embodiments, a user may provide such a user-specified search term "blood pressure," which may match a block describing storage at a first location of a dataset value having a dataset field name field name "BP," or "blood pressure." As another example, a user may provide such a user-specified search term "height," which may match a block describing storage at a first location of a dataset value having a dataset field name field name "height." As yet another example, a user may provide such a user-specified search term "weight," which may match a block describing storage at a first location of a dataset value having a dataset field name field name "weight."

The block chain based data protection system in an embodiment may retrieve or access all blocks in the same chain with this block describing storage of a dataset field name "social_security_number." For example, the block chain may further include another block describing storage at a second location (e.g., SalesForce™) of a dataset field name "SSN," having the same dataset field value "123-45-6789." Upon receiving a user deletion instruction, the block chain based data protection system in such an embodiment may identify both the datasets within this block chain (e.g., having the dataset field name "SSN," and having the dataset field name "social_security_number") for removal from the first and second locations, respectively. These dataset field names (e.g., "SSN," and "social_security_number") and the first and second locations of those datasets may be provided within data attributes of the start element 314 in an embodiment. In some embodiments, the start element 314 may identify more than one dataset for deletion at more than one location. In other embodiments, the start element 314 may identify a single dataset (e.g., identified at only one of the blocks within the block chain) for deletion. In such an embodiment, the block chain based data protection system may generate a separate data deletion process flow model for each block within the block chain (e.g., one data deletion process flow for deletion of each dataset described in each individual block of the block chain).

The block chain based data protection system in an embodiment may also insert a block chain tracking visual element 316 identifying the dataset to be deleted. The block chain based data protection system may further define one or more search terms that may be used to locate the metadata tracking block chain generated pursuant to visual element 316 for that dataset in the future, via the graphical visual user interface. For example, the block chain based data protection system may identify a dataset field value (e.g., "123-45-6789") based on the received user input identifying the dataset to be deleted, then provide search terms such as "deleted," or "removed" that may be used in the future to locate the block chain for tracking deletion of this dataset field value.

The deletion process flow modeled in FIG. 3B may also include a connector element 318, defining an action to be taken on the dataset identified by the user to be deleted. For example, the block chain data protection system in an embodiment may automatically set the connector element 318 to delete the dataset (e.g., dataset field name and dataset field value) from the location at which the dataset is stored and accessed at start element 314. Some such deletion methods may require authorization or validation that the user possesses necessarily credentials to perform such a deletion. Thus, the data deletion process flow may include a validation/authorization sub-process element 320 which may operate to provide such authorization or validation of credentials. In some embodiments, the block chain data protection system may prompt the user to provide such credentials or authorization via another graphical user interface, prior to execution of the data deletion process flow modeled in FIG. 3B. In other embodiments, the user may provide such authorization or credentials simultaneously with identifying the datasets to be deleted or removed. In either of these embodiments, the block chain based data protection system may include such user-provided authorization or credentials when automatically generating the validation/authorization sub-process element 320 (e.g., as data profiles associated with the validation/authorization sub-process element 320).

The deletion process flow depicted in FIG. 3B may also include an archive sub-process element 322 operating to store a copy of the deleted dataset in a secured archive. Such an archiving of deleted datasets may be provided in case of a rollback in which the user wishes to restore the deleted dataset back to its original location, defined within the start element 314. In such an embodiment, the archive sub-process element 322 may further associate the archived dataset within the archive storage location with this original storage location from which the dataset is being deleted.

A notification visual element 324 may also be included within the deletion process flow depicted in FIG. 3B. Such a notification visual element 324 in an embodiment may operate to transmit a notification to the enterprise network executing the deletion process that the deletion process has been completed. The notification transmitted may further identify each dataset deleted, as well as metadata associated with each dataset (e.g., location from which dataset was deleted, date and time of deletion, identification of process executed to perform such a deletion). The data deletion process flow thus modeled may also include a return data visual element 326 operating to transmit a success report or a failure report to the enterprise network indicating whether the deletion of datasets automatically set for deletion by the block chain based data protection system has been successfully completed upon execution of the data deletion process. The data deletion process may end with a stop element 328, indicating completion of the process flow. In such a way, the block chain based data protection system in an embodiment may automatically generate a deletion process operating to automatically delete one or more datasets identified through user input.

Figure 4:
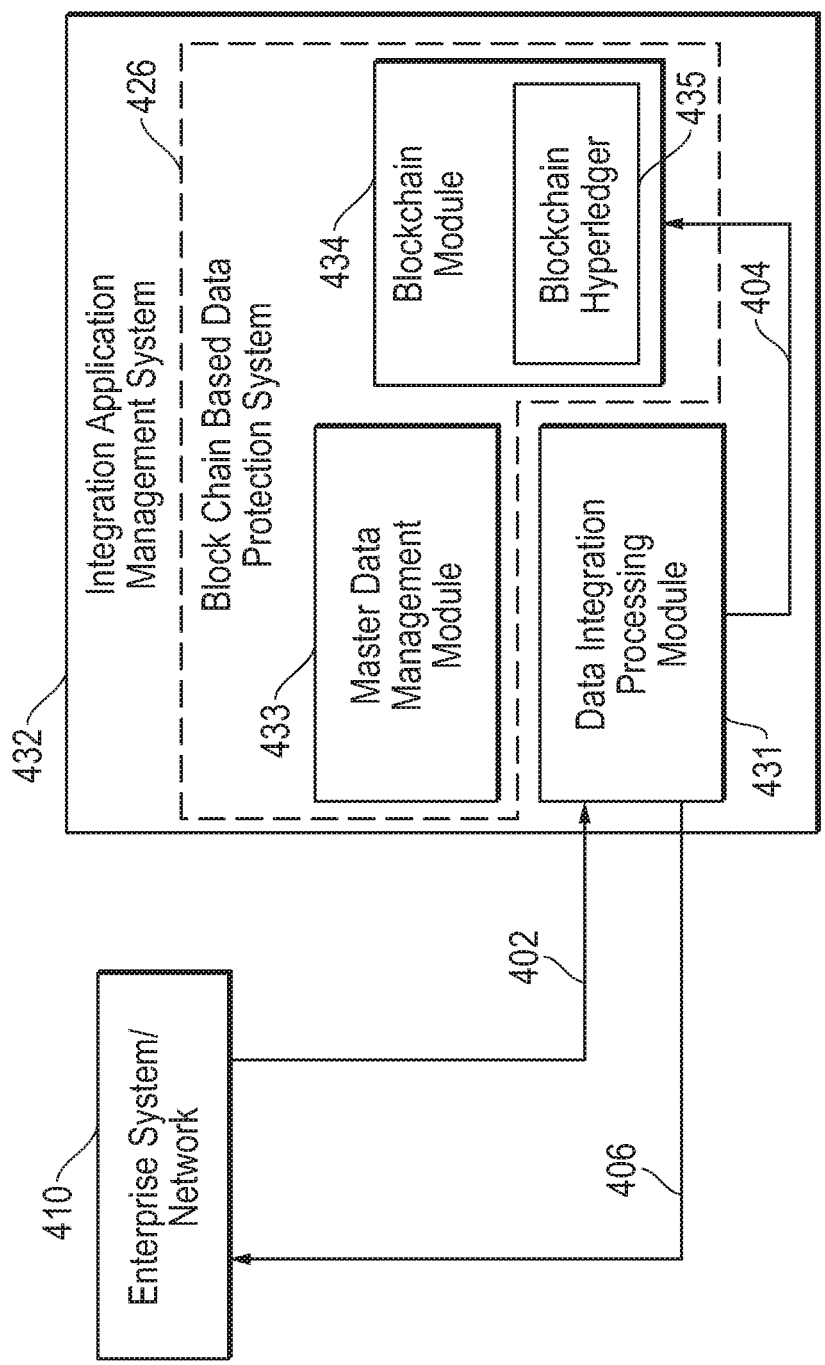
FIG. 4 is a block diagram illustrating a block chain module storing metadata tracking block chains according to an embodiment of the present disclosure.

FIG. 4 is a block diagram illustrating a block chain module storing metadata tracking block chains associated with dataset field values identified by the user as potentially containing sensitive personal information according to an embodiment of the present disclosure. As described herein, an ability to identify sensitive personal information and apply added security measures to data integration processes involving such sensitive personal information may lessen the risk of infringement of the GDPR and increase security of private information. As also described herein, a user in an embodiment may identify a dataset as containing sensitive personal information by inserting a block chain tracking visual element identifying that dataset into the customized data integration process flow modeled by the user (e.g., as described with reference to FIG. 3A above). A new block within a block chain, storing metadata for describing each action taken on a dataset field value within such an identified dataset may be generated and stored by the service provider for each execution of the customized data integration process involving that dataset in an embodiment.

For example, a user may access the graphical visual user interface described with reference to FIG. 3A from the enterprise system/network 410 in an embodiment. The user may create and edit customized data integration process flows via the graphical visual user interface, thus transmitting user instructions 402 that model the user's integration process flow to a data integration processing module 431 of the integration application management system 432 maintained and operated by the service provider system/server managing the graphical visual user interface. Such user instructions in an embodiment may include an instruction to insert any of the visual elements described with reference to FIG. 3A into the customized data integration process flow modeled by the user, which may specifically include a user block chain reporting instruction identifying a dataset field value for which a tracking block chain may be generated. A user in an embodiment may identify such a dataset field value by providing the exact dataset field value (e.g., "123-45-6789") within the user block chain instruction. The user may also provide, within the user block chain instruction, one or more user-specified search terms (e.g., "social_security_number") that may be found within the dataset field name associated with the dataset field value, which may be used to search for the user-specified dataset field value (e.g., "123-45-6789") following execution of the customized data integration process. Thus, the instructions 402 in an embodiment may also include such an identification of a dataset field value, or user-specified search terms that may be used to identify a dataset field value in the future.

The service provider system/server in an embodiment may also manage a block chain based data protection system 426, including a master data management module 433 and a block chain module 434. The block chain module 434 in an embodiment may operate to store and log blocks within block chains in an embodiment. The master data management module 433 in an embodiment may operate to manage storage by, and retrieval of block chains from the block chain module 434, according to received user instructions. In some embodiments, the master data management module may also compile information retrieved from block chains into user-requested reports, or manage deletion of user-specified datasets identified in retrieved blocks or block chains. Instructions 402 may define each step of a user-defined data integration process, including user block chain instructions to track storage locations for a user-specified dataset that may contain sensitive personal information. These user block chain instructions may be supplied by the user in an embodiment by inserting a block chain visual element into the customized data integration process flow and providing a user-specified dataset field value. As described with reference to FIG. 3A, the user may define one or more user-specified search terms that may be used to locate the metadata tracking block chain for a given dataset field value in the future (e.g., following execution of the customized data integration process modeled in FIG. 3A), via the graphical visual user interface. For example, the user instructions 402 may identify a dataset field value "123-45-6789," as well as search terms such as "social_security_number," "SSN," or "John Doe" that may be used in the future to locate the block chain for tracking this dataset field value.

In other example, the user may identify a dataset field value associated with a dataset field name "BP" or "blood_pressure," via the block chain tracking visual element 308 by directly entering this value, then provide search terms such as "BP," or "blood pressure" that may be used in the future to locate the block chain for tracking this dataset field value. As another example, the user may identify a dataset field value associated with a dataset field name "height," by directly entering this value, then provide search terms such as "height" that may be used in the future to locate the block chain for tracking this dataset field value. As yet another example, the user may identify a dataset field value associated with a dataset field name "weight," by directly entering this value, then provide search terms such as "weight" that may be used in the future to locate the block chain for tracking this dataset field value.

The data integration processing module 431 of the integration application management system 432 in an embodiment may operate within a standalone information handling system, within a single server, across a plurality of servers or information handling systems, or within a cloud infrastructure. In an embodiment, the data integration processing module 431 may operate to generate or customize code instructions (e.g., connector code sets) executable by the enterprise system network 410 to perform the data integration process modeled by the user via the graphical user interface. The data integration processing module 431 in an embodiment may transmit machine-executable code instructions and a runtime engine 406 for later execution of the modeled customized data integration process to the enterprise system/network 410. Such code instructions 406 may include commands to transmit an execution log from the user's enterprise network 410 to the integration application management system 432 or the block chain based data protection system 426 of the service provider describing one or more aspects of datasets for which the user has initiated block chain tracking pursuant to the visual integration flow modeled via the graphical user interface.

In other aspects, the data integration processing module 431 may receive the user identification 402 of a dataset field value (e.g., "123-45-6789") to be tracked, and may transmit instructions 404 to create or update a block chain for such tracking to the block chain module 434. These instructions 404 may identify the dataset field value (e.g., "123-45-6789"), as well as the customized data integration process in which such a dataset will be created, read, updated, or deleted pursuant to the user instructions 402. The block chain module 434 in an embodiment may create a new metadata tracking block for the dataset field value identified by the user for tracking, which may be updated following execution of the customized data integration process code instructions 406 transmitted to the enterprise system 410, to include locations at which that dataset field value has been stored or otherwise manipulated pursuant to that customized data integration process (e.g., the customized data integration process modeled in an embodiment described with reference to FIG. 3A). The newly created block in such an embodiment may be stored in the block chain module 434 of the block chain based data protection system 426 at the service provider, and may be accessed and managed by the master data management module 433. The block chain hyper ledger 435 in such an embodiment may store an association between the metadata tracking block and the user-specified dataset field value and the one or more user-specified search terms or keys supplied by the user (e.g., "social_security_number," "SSN," or "John Doe") that may be used to later identify the block chain for the identified dataset field value (e.g., "123-45-6789"). In some embodiments, the block chain module 434 may further compare the newly created metadata tracking block against other node registers operating within the service provider, the enterprise system 410, or external to both of these, in order to ensure the accuracy of information stored within the newly created metadata tracking block.

Figure 5:
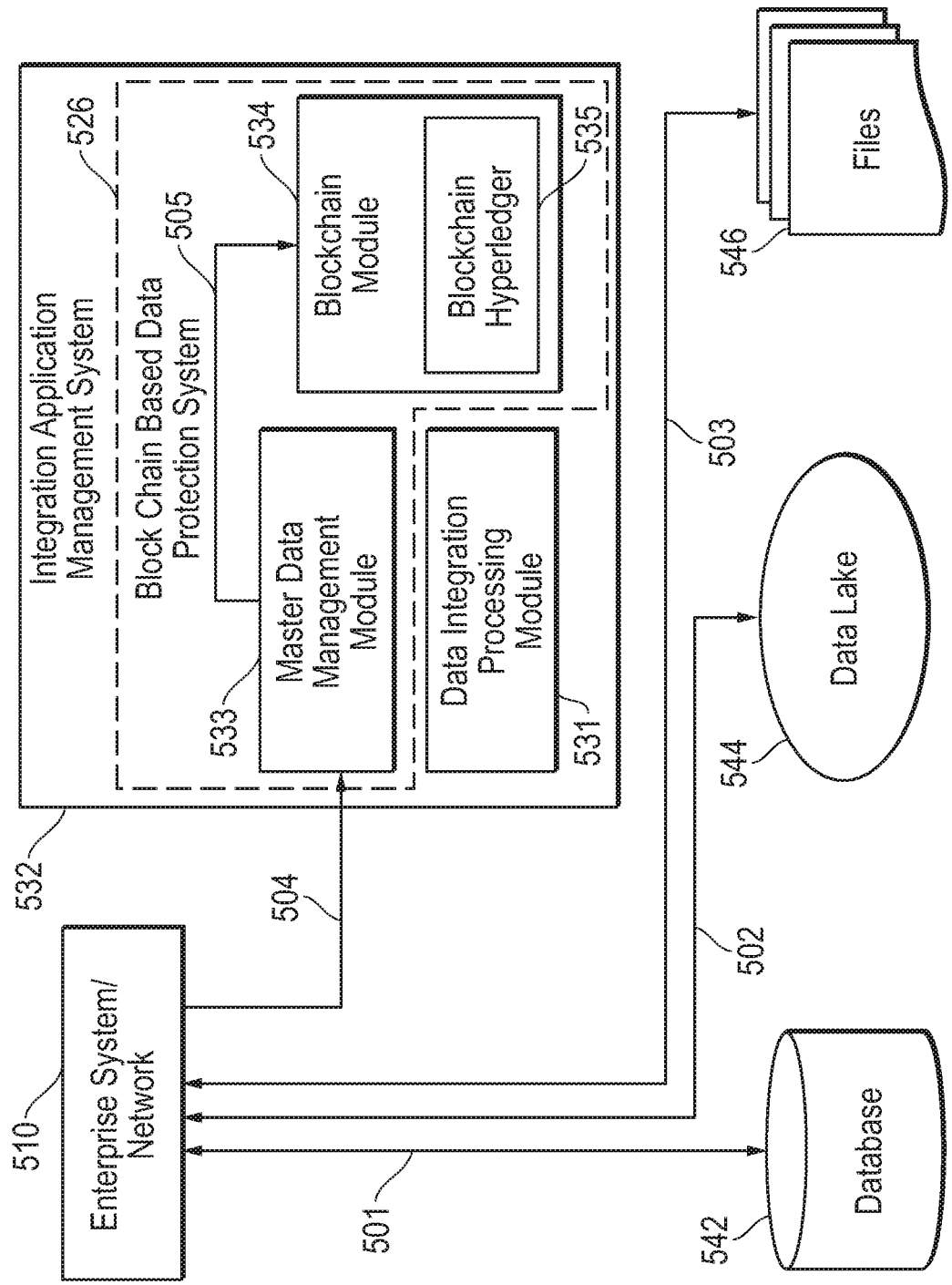
FIG. 5 is a block diagram illustrating a master data management module for tracking storage and manipulation of a user-specified dataset field value according to an embodiment of the present disclosure.

FIG. 5 is a block diagram illustrating a master data management module for tracking storage and manipulation of a user-specified dataset field value potentially containing sensitive personal information, through execution of a user-modeled customized data integration process according to an embodiment of the present disclosure. Upon receipt of the runtime engine and code instructions for execution of the user-modeled customized data integration process at the enterprise system 510 in an embodiment (as described above with reference to FIG. 4), the user may initiate the runtime engine to execute those code instructions.

Pursuant to such an execution, an information handling system within the enterprise system 510 may establish communication with one or more remote server locations or backend applications managing the data to be integrated. For example, the enterprise system 510 may establish communication with a trading partner, or with a cloud-based storage location or application as discussed with respect to FIG. 2 above. Such trading partners or applications may manage data at a database 542, a data lake 544, or within one or more files 546 stored on a server in an embodiment. The enterprise system 510 in such an embodiment may establish such a connection via a network, for example.

The enterprise system 510 in an embodiment may execute code instructions including the creation, reading, updating, or deletion (CRUD) of one or more datasets pursuant to the customized data integration process modeled by the user via the graphical user interface described above, for example in an embodiment described with respect to FIG. 3A. A single customized data integration process, modeled in a single customized data integration process flow, may include one or more of these actions (e.g., CRUD) performed upon a plurality of different datasets, in communication with one or more remote locations (e.g., database 542, data lake 544, or files 546). For example, the enterprise system 510 in an embodiment may execute code instructions 501 of a customized data integration process to read a dataset including the dataset field name "social" and the dataset field value "123-45-6789" from the database 542. The enterprise system 510 in such an embodiment may also execute code instructions 502, pursuant to the same or another customized data integration process, to update a dataset having a dataset field name "SSN" stored at the data lake 544 to include a dataset field value of "123-45-6789." Similarly, the enterprise system 510 in such an embodiment may also execute code instructions 503, pursuant to the same or another customized data integration process, to create a dataset having a dataset field name "social_security_number" stored in files 546 to include a dataset field value of "123-45-6789." As described herein, the naming conventions or dataset field names applied to certain dataset field values may vary among applications. For example, the database 542 in an embodiment may be managed within a Customer Relationship Management (CRM) platform, such as SalesForce™, while the data lake 544 is managed by an Enterprise Resource Planning (ERP) platform, such as Oracle NetSuite™. While both the CRM and ERP in such an example embodiment may store datasets including the same social security number (e.g., "123-45-6789"), those datasets may have different dataset field names (e.g., "social," or "SSN"), depending on the conventions applied by each platform. Thus, a single customized data integration process may include accessing, storing, or updating the same dataset field value (e.g., social security number "123-45-6789") at multiple locations, with each location associating the dataset field value with a different dataset field name (e.g., "social," "SSN," or "social_security_number").

Following execution of code instructions 501, 502, and 503, including creation, reading, and updating of a single dataset field value at multiple locations (e.g., 542, 544, and 546) as executed by the runtime engine at the enterprise system 510, the enterprise system 510 in an embodiment may generate an execution log describing such an execution. The execution log in such an embodiment may include metadata for the datasets created, read, updated, or deleted pursuant to the code instructions 501, 502, and 503. Such metadata may describe the dataset field name and dataset field values for each dataset involved, whether each dataset was created, read, updated, or deleted, during the customized data integration process(es), and the address-identified memory locations involved in such an action. For example, an execution log in an embodiment may include a first entry indicating a first dataset with a dataset field name "social" and a dataset field value "123-45-6789" was read from database 542, a second entry indicating a second dataset with a dataset field name "SSN" was updated to include dataset field value "123-45-6789" at data lake 544, and a third entry indicating a third dataset with a dataset field name "social_security_number," and a dataset field value "123-45-6789" was created within files 546. In other embodiments, in which instructions 501, 502, and 503 are executed pursuant to separate customized data integration processes, or separate executions of the same customized data integration processes, the first, second, and third entries described directly above may appear, respectively, in three separate execution logs.

The execution log in such an embodiment may also identify the enterprise system 510, the time of execution, if any of the datasets created, read, updated, or deleted have been flagged by the user for block chain tracking, and the customized data integration process that was executed. Identification of the customized data integration process may be sufficient to further identify the customized data integration process flow created by the user via the graphical visual user interface, (e.g., the customized data integration process flow described above in an embodiment with reference to FIG. 3A). Code instructions for the customized data integration process in an embodiment may direct creation of the execution log, and may include instructions to associate any dataset field values identified within a user block chain instruction with a flag for block chain tracking. For example, the code instructions for the customized data integration process in an embodiment may include code instructions to generate an execution log that applies a block chain tracking flag to a first entry describing a first dataset with a dataset field name "social" and a dataset field value "123-45-6789," to a second entry describing the second dataset with a dataset field name "SSN" and a dataset field value "123-45-6789," and to a third entry describing the third dataset with a dataset field name "social_security_number."

The enterprise system 510 in such an embodiment may transmit the execution log 504 to the master data management module 533 of the block chain based data protection system 526 managed by the service provider. In other embodiments, in which instructions 501, 502, and 503 are executed pursuant to separate customized data integration processes, or separate executions of the same customized data integration processes, resulting in three separate execution logs, the enterprise system 510 may transmit each of these three separate execution logs to the master data management module 533 of the block chain based data protection system 526. The master data management module 533 of the block chain based data protection system 526 in an embodiment may operate within a standalone information handling system, within a single server, across a plurality of servers or information handling systems, or within a cloud infrastructure.

Upon receipt of the execution log at the block chain based data protection system 526 of the service provider, the master data management module 533 may determine whether the execution log includes metadata for any datasets flagged by the user for block chain tracking. If the execution log includes such metadata, the master data management module 533 of the block chain based data protection system 526 may parse such metadata describing the dataset that has been flagged and the customized data integration process pursuant to which such a dataset has been flagged from the execution log. The master data management module 533 may transmit instructions 505 to the block chain module 534 of the block chain based data protection system 526 to update metadata tracking block chains associated with each flagged dataset with the parsed metadata. For example, the execution log may have flagged the first dataset with a dataset field name "social" and a dataset field value "123-45-6789," the second dataset with a dataset field name "SSN" and a dataset field value "123-45-6789," and the third entry indicating a third dataset with a dataset field name "social_security_number" for block chain tracking.

In such an embodiment, the master data management module 533 may transmit an instruction 505 to the block chain module 534 to store in the block chain hyperledger 535 metadata associated with these three datasets in the execution log in a new metadata tracking block (or multiple tracking blocks, each containing metadata for one of the three datasets), and to link that newly created block(s) to an already established block or block chain stored in the block chain module 534 and associated with the dataset field value "123-45-6789." For example, the block chain module 534 may create a new metadata tracking block recording that a first dataset with a dataset field name "social" and a dataset field value "123-45-6789" was read from database 542, a second entry indicating a second dataset with a dataset field name "SSN" and a dataset field value "123-45-6789" was updated at data lake 544, and a third entry indicating a third dataset with a dataset field name "social_security_number" was created within files 546, at the recorded time of execution of an identified, single customized data integration process. As another example, the block chain module 534 may create a first new metadata tracking block recording that a first dataset with a dataset field name "social" and a dataset field value "123-45-6789" was read from database 542, create a second new metadata tracking block recording that a second entry indicating a second dataset with a dataset field name "SSN" and a dataset field value "123-45-6789" was updated at data lake 544, and create a third new metadata tracking block recording that a third entry indicating a third dataset with a dataset field name "social_security_number" was created within files 546, at the recorded time of execution of an identified, single customized data integration process.

In yet another example, the block chain module 534 may create a first new metadata tracking block recording that a first dataset with a dataset field name "social" and a dataset field value "123-45-6789" was read from database 542 at the recorded time of a first execution of an identified, single customized data integration process. The block chain module 534 in such an example embodiment may also create a second new metadata tracking block recording that a second dataset with a dataset field name "SSN" and a dataset field value "123-45-6789" was updated at data lake 544 at the recorded time of a second execution of the identified, single customized data integration process. In addition, the block chain module 534 in such an example embodiment may also create a third new metadata tracking block recording that a third dataset with a dataset field name "social_security_number" was created within files 546, at the recorded time of a third execution of the identified, single customized data integration process.

In still another example, the block chain module 534 may create a first new metadata tracking block recording that a first dataset with a dataset field name "social" and a dataset field value "123-45-6789" was read from database 542 at the recorded time of execution of a first identified customized data integration process. The block chain module 534 in such an example embodiment may also create a second new metadata tracking block recording that a second dataset with a dataset field name "SSN" and a dataset field value "123-45-6789" was updated at data lake 544 at the recorded time of an execution of a second identified customized data integration process. In addition, the block chain module 534 in such an example embodiment may also create a third new metadata tracking block recording that a third dataset with a dataset field name "social_security_number" was created within files 546, at the recorded time of an execution of a third identified customized data integration process. In some embodiments, the block chain module 534 may further compare the newly created metadata tracking block against other node registers operating within the service provider 530, the enterprise system 510, or external to both of these. The block chain module 534 may then store the newly created block(s) within the service provider system 530, and update the block chain hyper ledger 535 to reflect addition of the newly created block(s) to the pre-existing block chain associated with the data field value "123-45-6789."

In some embodiments, later executions of the same integration process may result in creation of new metadata tracking blocks associated with the same dataset field value. Each of these metadata tracking blocks, generated at multiple steps within the execution of a single integration process, or generated pursuant to multiple executions of an integration process, may be linked together to form a block chain describing each of the locations at which a single dataset field value has been stored. Such block chains may be searched by dataset field value, or by another metadata field value set by the user. In such a way, the block chain associated with a single dataset field value may track the storage locations of that dataset over time, even if the dataset field name describing that dataset field value has changed over time.

Figure 6:
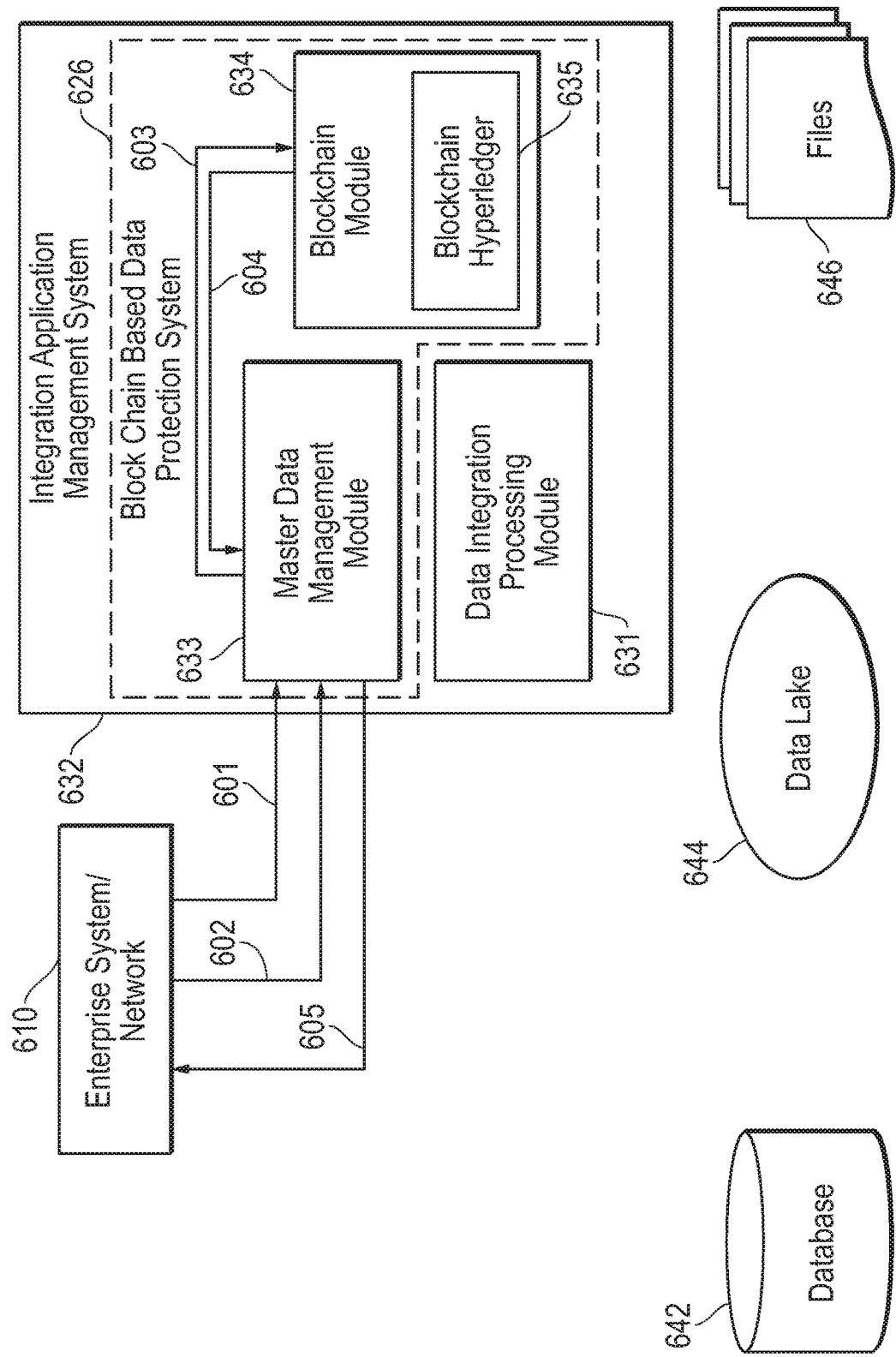
FIG. 6 is a block diagram illustrating a data integration processing module for reporting physical storage locations of a dataset field value pursuant to one or more executed integration processes according to an embodiment of the present disclosure.

FIG. 6 is a block diagram illustrating a data integration processing module for reporting physical storage locations of a dataset field value pursuant to one or more executed integration processes identified by the user as potentially containing sensitive personal information, determined based on metadata stored in a block chain associated with the dataset field value according to an embodiment of the present disclosure. As described herein, users executing customized data integration processes for creation, reading, updating, or deletion of datasets containing such potentially sensitive personal information may request a report of known storage locations for a given dataset field value over time, pursuant to such executed customized data integration processes in embodiments. For example, a block chain based data protection system 626 of a service provider in an embodiment may receive a user reporting instruction 601 for a dataset field value in an embodiment. As also described herein, users executing customized data integration processes for creation, reading, updating, or deletion of datasets containing such potentially sensitive personal information may request deletion of a given dataset field value from one or more locations at which such a dataset has been stored over time, pursuant to such executed customized data integration processes in embodiments. For example, a block chain based data protection system 626 of a service provider in an embodiment may receive a user deletion instruction 602 for a dataset field value in an embodiment. The user reporting instruction 601 or the user deletion instruction 602 in such an embodiment may identify the dataset field value by providing a an exact user-specified dataset field value (e.g., "123-45-6789"), or by providing a user-specified search term (e.g., "social_security_number") which may be used to identify a block chain associated with an exact dataset field value (e.g., "123-45-6789").

Such a user reporting instruction 601 or user deletion instruction 602 may be received via the master data management module 633 of the block chain based data protection system 626, which may then transmit to the block chain module 634 of the block chain based data protection system 626 a request 603 for retrieval of the stored block chain associated with the exact user-specified dataset field value or associated with the user-specified search term. As described herein, the block chain hyper ledger 635 in an embodiment may store an association between the metadata tracking block, the user-specified dataset field value, and the one or more user-specified search terms or keys supplied by the user that may be used to later identify the block chain for the identified dataset field value. For example, in an embodiment described with reference to FIG. 3A, the user may insert a block chain tracking visual element 308 in the process flow to track datasets having a dataset field value "123-45-6789." In such an example embodiment, the user may use the graphical visual user interface to further associate block chains created pursuant to insertion of the block chain tracking visual element 308 into the process flow with user-selected search terms such as "social," "social_security_number," or "SSN." Returning to FIG. 6, in such an example embodiment, a block chain recorded in the block chain hyperledger 635 for a dataset having the dataset field value "123-45-6789" may also be associated in the hyperledger 635 with the search terms "social," "social_security_number," or "SSN."

In an embodiment, the block chain module 634 of the block chain based data protection system 626 may access the block chain hyperledger 635 to retrieve an identification of the block chain storing metadata for the user-identified dataset field value, or an identification of the block chain associated with the user-specified search term. In an example embodiment, the block chain based data protection system 626 of the service provider may receive a reporting request 601 or a user deletion instruction 602 for all datasets having a field value "123-45-6789." In such an embodiment, the master data management module 633 of the block chain based data protection system 626 may transmit an instruction 603 to the block chain module 634 of the block chain based data protection system 626 to retrieve all block chains associated in the block chain hyperledger 635 with a dataset field value "123-45-6789." The block chain module 634 in such an embodiment may transmit all block chains 604 associated with dataset field value "123-45-6789" back to the master data management module 633. Such a block chain in an example embodiment may include, for example, a first block identifying a dataset having a dataset field name "social," and a dataset field value "123-45-6789," which was stored at database 642 during execution of a first identified customized data integration process. In such an embodiment, the block chain may also contain a second block identifying, for example, a dataset having a dataset field name "SSN," and a dataset field value "123-45-6789," which was stored at data lake 644 during execution of a second identified customized data integration process. Such a block chain in an embodiment may also include, for example, a third block identifying a dataset having a dataset field name "social_security_number," and a dataset field value "123-45-6789," which was stored at files 646 during execution of a third identified customized data integration process.

In an embodiment, the block chain based data protection system 626 of the service provider may receive a user reporting instruction 601 or a user deletion instruction 602 for all datasets associated within a block chain with one or more of the search term "social_security_number." The master data management module 633 of the block chain based data protection system 626 in such an embodiment may transmit an instruction 603 to the block chain module 634 of the block chain based data protection system 626 to retrieve all block chains associated within the block chain hyper ledger 635 with the one or more search term "social_security_number." As described herein, the block chain hyper ledger 635 may have associated the dataset field value "123-45-6789" with one or more of these search terms "social," "social_security_number," or "SSN." Thus, the block chain module 634 in such an embodiment may transmit all block chains 604 associated with the dataset field value "123-45-6789" back to the master data management module 633. In some embodiments, the master data management module 633 and block chain module 634 may support Boolean search capabilities, resulting in identification of block chains meeting two or more search terms, in combination. In such embodiments, the dataset field value may comprise one of the two or more search terms.

The block chain module 634 in an embodiment may then transmit the identified block chain 604 (or single block in some circumstances) to the master data management module 633. In such an embodiment, the master data management module 633 may parse the information given within one or more received block chains 604, to identify address-identified memory locations at which a user-specified dataset field value or a dataset field value identified within the block chain has been stored, and to generate a report 605 detailing such information. For example, the master data management module 633 in an embodiment may parse the received block chain 604 described above, to identify that the dataset field value "123-45-6789" was stored at database 642 under a dataset field name "social" during execution of a first identified customized data integration process, stored at data lake 644 under a dataset field name "SSN," and stored at files 646 under a dataset field name "social_security_number" during execution of a third identified customized data integration process.

Such a report 605 may further detail other information given within the block chain(s) 604 associated with such a dataset field value, and parsed by the master data management module 633. For example, a report 605 generated at the master data management module 633 in an embodiment may identify a dataset field name associated with the identified dataset field value at each listed address-identified memory location, one or more integration processes that resulted in the creation, reading, updating, or deletion of the identified dataset field value at or from the listed address-identified memory locations, and the times and dates at which such actions occurred.

Thus, the user may specify only a single search term (e.g., "social_security_number"), and may receive a report on all datasets stored at the database 642, data lake 644, and files 646 that include the dataset field value "123-45-6789," despite the fact that this dataset field value is stored at the database 642 and the data lake 642 under dataset field names other than "social_security_number." The master data management module 605 of the service provider block chain based data protection system 626 in such an embodiment may transmit the report 605 for review at the enterprise system/network 610. In such a way, the block chain based data protection system in embodiments may enable users to comply with GDPR reporting requirements by generating a report detailing each of the address-identified memory locations at which the user-identified dataset field value has been stored, and the dataset field name associated with that dataset field value at each of these address-identified memory locations.

Figure 7:
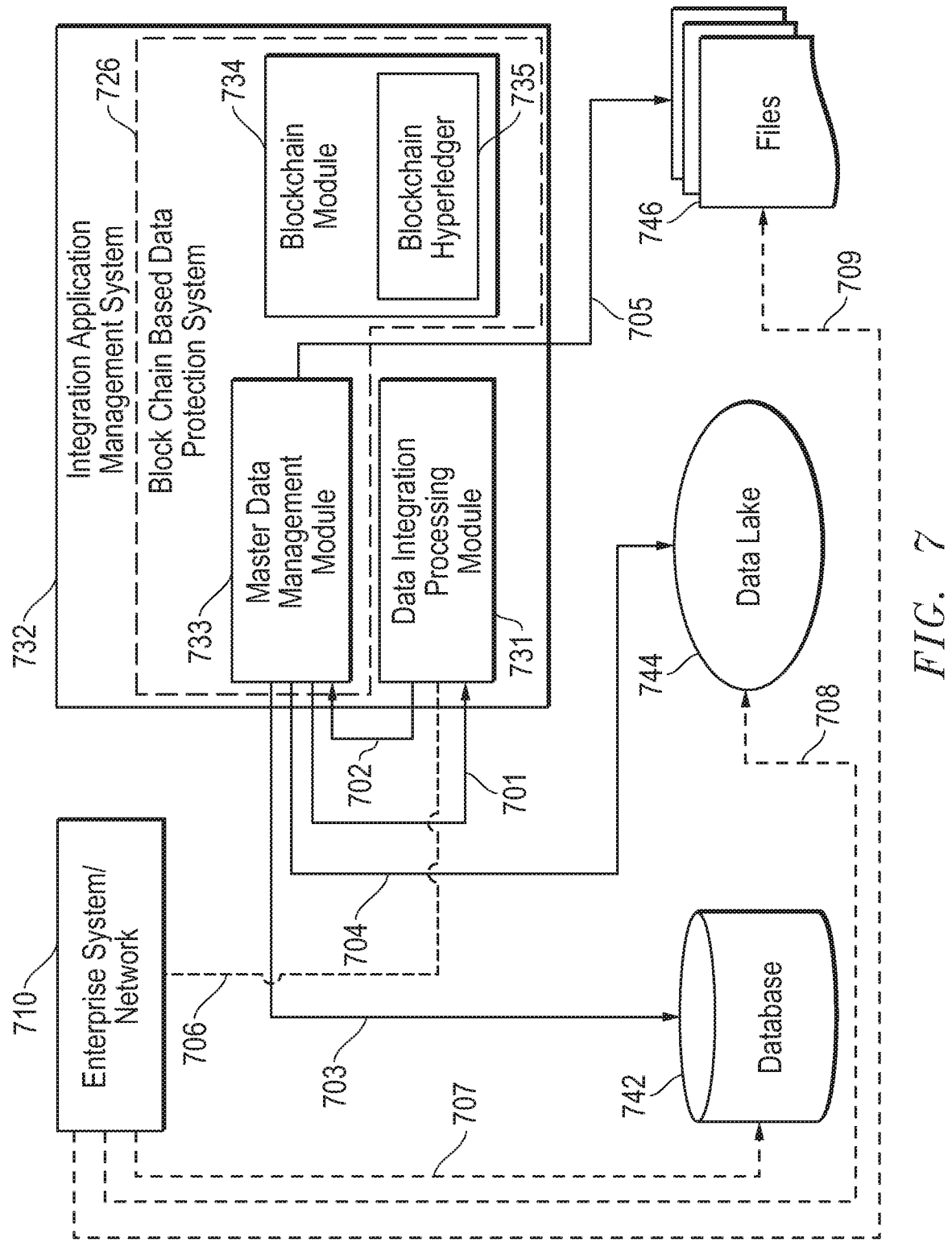
FIG. 7 is a block diagram illustrating a master data management module for automatic deletion of a dataset field value from one or more storage locations according to an embodiment of the present disclosure.

FIG. 7 is a block diagram illustrating a master data management module for automatic deletion of a dataset field value identified by the user as potentially containing sensitive personal information, determined based on metadata stored in a block chain associated with the dataset field value from one or more storage locations according to an embodiment of the present disclosure. As described herein, a user may request removal of dataset field values at one or more known storage locations. For example, if an employee leaves a position with the user, the user may wish to remove all potentially sensitive personal information associated with that employee at each address-identified memory location under the control of the user/employer. In some embodiments, the service provider may automatically initiate a deletion process for deletion of each of these identified dataset field values, at each location identified within the block chains associated with each of these identified dataset field values.

As described herein (e.g., with respect to FIG. 6 and incorporated into the discussion of the system operation described in FIG. 7), the block chain based data protection system 626 of the service provider may receive a user deletion request 602 for user-identified dataset field values, or for dataset field values associated within a stored block chain with a user-specified search term. In response to a request by the master data management module 633 of the block chain based data protection system 626 in such an embodiment, the block chain module 634 of the block chain based data protection system 626 may transmit all block chains associated the user-specified dataset field value, or associated with the user-specified search term(s) to the master data management module 633. For example, the master data management module 633 in an embodiment may receive all block chains associated within the block chain hyper ledger 635 with a user-specified dataset field value "123-45-6789," or with search term "social_security_number." These block chains may be temporarily stored at or accessible by the master data management module 633, following generation of a report describing physical storage locations of datasets associated with these received block chains. Upon receipt of such a user deletion instruction 602 to delete a specifically identified dataset associated with a known block chain, the master data management module 633 in an embodiment may reference the block chain associated with this specifically identified dataset, as received from the block chain module 634, to identify one or more address-identified memory locations at which the dataset has been stored, or at which it is currently stored. For example, the master data management module 633 may access a received block chain to determine a dataset field value "123-45-6789" was stored at database 642 under a dataset field name "social" during execution of a first identified customized data integration process, stored at data lake 644 under a dataset field name "SSN," and stored at files 646 under a dataset field name "social_security_number" during execution of a third identified customized data integration process.

Turning to FIG. 7 showing the operation of the automatic deletion activity, upon identification of one or more locations at which a user-specified dataset field value has been stored, the master data management module 733 of the block chain based data protection system 726 in an embodiment may initiate an automatic deletion process to delete the user-specified dataset field value from one or more of these locations. For example, the master data management module 733 of the block chain based data protection system 726 in an embodiment may transmit instructions 701 to the data integration process module 731 of the integration application management system 732 to generate a deletion process for deletion of the datasets having the dataset field value "123-45-6789" identified within the user deletion instruction from one or more of the locations 742, 744, or 746 at which the identified dataset is currently stored. Such an instruction 701 may contemplate deletion of the identified dataset from all known storage locations, or from a subset of known storage locations. For example, the user may identify, within the user deletion instruction, one or more subsets (e.g., only databases, only data lakes, only files, or only locations outside of a specified geographic area) of known storage locations from which the identified dataset should be deleted or all. In response to the instruction 701, the data integration processing module 731 of the integration application management system 732 in an embodiment may generate a deletion process flow model for such a deletion process. For example, the data integration processing module 731 of the integration application management system 732 may generate a deletion process flow model such as discussed above with respect to FIG. 3B. The deletion code instructions associated with each of the visual elements depicted in such an embodiment described with respect to FIG. 3B, as well as the runtime engine generated by the data integration process module 731 for execution of such deletion code instructions may be stored at the data integration process module 731 upon automatic creation of such a deletion process flow model. The data integration process module 731 of the integration application management system 732 may then transmit the underlying deletion code instructions and runtime engine 702 to the master data management module 733 of the block chain based data protection system 726 for execution of the deletion process modeled by the deletion process flow model (e.g., as described with reference to FIG. 3B) by the service provider server/system. In other embodiments, the data integration process module 731 of the integration application management system 732 may instead transmit the underlying deletion code instructions and runtime engine 706 directly to the enterprise system/network 710 or to the enterprise system/network 710 via the master data management module 733 (not shown) for execution of the deletion actions by the enterprise system/network 710.

The master data management module 733 of the block chain based data protection system 726 in an embodiment may automatically execute the deletion process at the service provider system/server by executing the runtime engine and deletion code instructions 702 received from the data integration process module 731 of the integration application management system 726. Such a deletion process may operate to delete one or more datasets identified by the enterprise system/network 710 in the user deletion instruction from one or more address-identified storage locations 742, 744, or 746 identified as currently storing such identified datasets by the master data management module 733 of the block chain based data protection system 726. For example, the deletion process initiated by the master data management module 733 of the block chain based data protection system 726 and executed by the received runtime engine 702 may operate to transmit an instruction 703 to delete the identified dataset from the database 742, an instruction 704 to delete the identified dataset from the data lake 744, or an instruction 705 to delete the identified dataset from the files 746.

In another embodiment, the enterprise system/network 710 in an embodiment may execute the deletion process by executing the runtime engine and deletion code instructions 706 received from the data integration process module 731 or via the master data management module 733 of the integration application management system 726. For example, the deletion process initiated at the enterprise system/network 710 and executed by the received runtime engine 706 may operate to transmit an instruction 707 to delete the identified dataset from the database 742, an instruction 708 to delete the identified dataset from the data lake 744, or an instruction 709 to delete the identified dataset from the files 746. In such a way, the block chain based data protection system in an embodiment may automatically delete datasets identified by a user as potentially containing sensitive personal information at address-identified storage locations recorded as having such sensitive personal information, and enable users to comply with reporting and mitigating GDPR requirements, and to ensure proper storage and deletion, where appropriate, of the sensitive personal information. The execution of the deletion action for sensitive personal information at the one or more address-identified storage locations may be recorded as a block in the block chain hyperledger 735 via the blockchain module 734 in some embodiments. Thus, the status of the sensitive personal information at various address-identified storage locations may be recorded in the immutable record and reported as needed in some embodiments herein.

Figure 8:
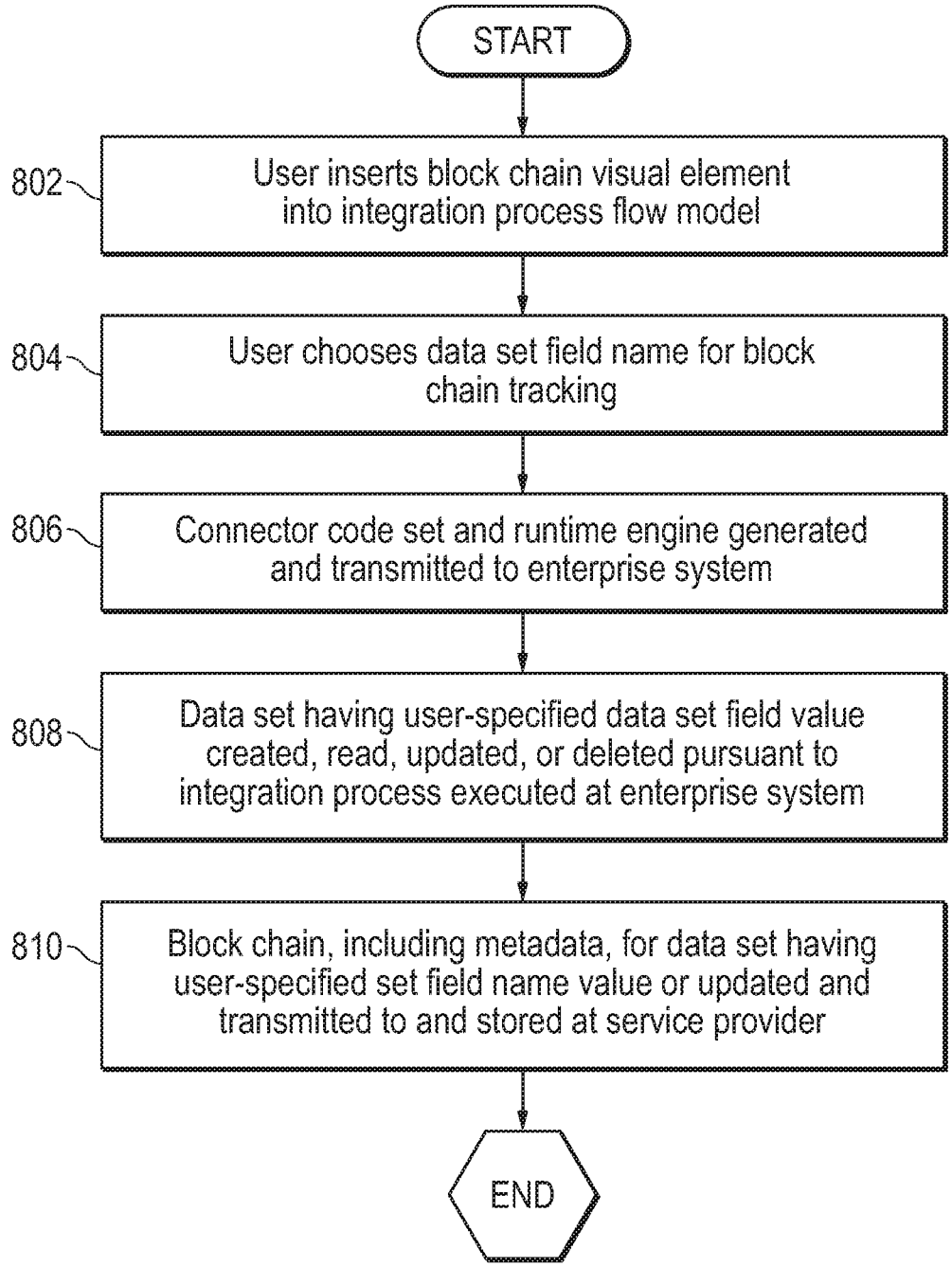
FIG. 8 is a flow diagram illustrating a method of creating a block chain describing physical storage locations for a dataset field value according to an embodiment of the present disclosure.

FIG. 8 is a flow diagram illustrating a method of creating or updating a block chain describing physical storage locations for, and one or more dataset field names associated with a dataset field value according to an embodiment of the present disclosure. As described herein, a single dataset field value may receive multiple dataset field names throughout one or more customized data integration processes, pursuant to which the data field value is stored at one or more address-identified memory locations. Embodiments of the present disclosure address this issue by creating and referencing a block chain tracking physical storage locations for each dataset field value identified as containing potentially sensitive personal information, and each dataset field name associated therewith at each recorded storage location.

At block 802, a user in an embodiment may insert a block chain visual element into an integration process flow model. For example, in an embodiment described with reference to FIG. 3A, if a user anticipates a modeled integration process may access, copy, transmit, or otherwise manipulate a dataset field value likely to include sensitive information (e.g., personal information protected under the GDPR), the user may insert a block chain tracking visual element 308 identifying such dataset field values. In such an embodiment, dataset field values may be identified based on a search for specific terms within metadata associated with datasets. Such a user block chain instruction may result in the generation of a block containing metadata describing the address-identified memory location at which the dataset field value likely to include sensitive personal information is stored, pursuant to each execution of the integration process modeled within the process flow of FIG. 3B. Thus, multiple blocks may be generated, with each block describing a single instance in which the identified dataset field value was stored at a given address-identified memory location. Each of these multiple blocks in an embodiment may be cryptographically linked to one another to form a block chain, which may be stored at one of a plurality of nodes. As described herein, the decentralized, public, cryptographic linking structure of block chains in an embodiment may provide a substantially immutable record of each transaction recorded within each block. Thus, the block chain created pursuant to a received user block chain instruction may provide an immutable record of each address-identified memory location at which an identified dataset field value has been stored pursuant to each execution of the user-modeled customized integration process.

As another example, in an embodiment described with reference to FIG. 4, a user may create and edit customized data integration process flows via the graphical visual user interface, thus transmitting instructions 402 that model the user's integration process flow (including a user block chain instruction) to a data integration processing module 431 maintained and operated by the service provider system/server 430 managing the graphical visual user interface. Such instructions 402 may define each step of a user-defined data integration process, including user block chain instructions to track storage locations for a user-specified dataset that may contain sensitive personal information. These user block chain instructions may identify a dataset field value the user believes may include sensitive personal information, and may also include one or more search terms or keys that may be used to later identify the block chain for the identified dataset field value. The block of the blockchains may also include entries recording any updates that have occurred at address-identified locations that may contain sensitive personal information including, for example, block chain records in blocks indicating deletion of sensitive personal information at such address-identified locations when that has occurred for later reporting purposes.

The user in an embodiment may choose a dataset field name for block chain tracking at block 804. For example, in an embodiment described with reference to FIG. 3A, upon insertion of the block chain tracking visual element 308 into the integration flow, a user may be prompted to provide search terms to be used to identify datasets being integrated by the modeled process that may contain potentially sensitive personal information or to identify such datasets by a specific dataset field value following a future execution of the modeled customized data integration process. The user may further define one or more search terms that may be used to locate the metadata tracking block chain for that dataset in the future, via the graphical visual user interface. For example, the user may identify a dataset field value "123-45-6789" via the block chain tracking visual element 308 by directly entering this value, then provide search terms such as "social_security_number," or "SSN" that may be used in the future to locate the block chain for tracking this dataset field value for a particular dataset value or class of dataset values depending on the operation being searched.

At block 806, the block chain based data protection system in an embodiment may generate connector code sets and a runtime engine for the modeled customized data integration process and transmit them to an enterprise system. For example, in an embodiment described with reference to FIG. 4, the data integration processing module 431 may operate to generate or customize code instructions (e.g., connector code sets) executable by the enterprise system network 410 to perform the customized data integration process modeled by the user via the graphical user interface. The data integration processing module 431 in an embodiment may transmit machine-executable code instructions 406 for executing the modeled customized data integration process and a runtime engine for later execution thereof to the enterprise system/network 410. Such code instructions 406 may include commands to transmit an execution log from the user's enterprise network 410 to the service provider 430 describing one or more aspects of datasets for which the user has initiated block chain tracking pursuant to the customized data integration process flow modeled via the graphical user interface.

For example, in an embodiment described with reference to FIG. 3A, the block chain tracking visual element 308 may be associated with code instructions directing creation of an execution log that includes metadata associated with user-identified datasets. Such metadata may further include the locations at which the dataset is stored pursuant to the modeled customized data integration process during later executions thereof, as well as the dataset field names under which such identified dataset field values are stored at those locations. The code instructions may further include a command to transmit the generated execution log with such metadata from the remote location at which the integration is later executed to the service provider managing the integration process-modeling user interface shown in FIG. 3A.

In other aspects, in an embodiment described with respect to FIG. 4, the data integration processing module 431 may transmit instructions 404 to create or add blocks to a block chain identifying a dataset field value for such a dataset, as well as the integration process in which such a dataset will be created, read, updated, or deleted pursuant to the user instructions 402 to the block chain module 434. The block chain module 434 in such an embodiment may then create a new metadata tracking block identifying the user-identified dataset and add this newly created block to an existing block chain, if one exists, which may later receive more additionally created blocks, following execution of the integration process modeled by the user.

The dataset having the user-specified dataset field name may be created, read, updated, or deleted pursuant to the customized data integration process executed at the enterprise system in an embodiment at block 808. For example, in an embodiment described with reference to FIG. 5, upon receipt of the runtime engine and code instructions for execution of the user-modeled customized data integration process at the enterprise system 510, the user may initiate the runtime engine to execute those code instructions. An information handling system within the enterprise system 510 executing the runtime engine may then establish communication with one or more remote server locations or backend applications (e.g., database 542, data lake 544, or files 546).

Code instructions executed at the enterprise system 510 by such a runtime engine may direct the creation, reading, updating, or deletion (CRUD) of one or more datasets pursuant to a user-modeled customized data integration process flow. For example, the enterprise system 510 in an embodiment may execute code instructions 501 of an integration process to read a dataset including the dataset field name "social" and the dataset field value "123-45-6789" from the database 542, update a dataset having a dataset field name "SSN" stored at the data lake 544 to include a dataset field value of "123-45-6789," and to create a dataset having a dataset field name "social_security_number" stored in files 546 to include a dataset field value of "123-45-6789." Thus, a single customized data integration process may include accessing, storing, or updating the same dataset field value (e.g., social security number "123-45-6789") at multiple locations, with each location associating the dataset field value with a different dataset field name (e.g., "social," "SSN," or "social_security_number"). In other embodiments, the instructions 501, 502, and 503 may be transmitted pursuant to three separate executions of a single customized data integration process, or pursuant to three separate customized data integration processes, for example.

At block 810, a metadata block, including metadata for the dataset having the user-specified dataset field value may be created in an embodiment, transmitted and added to an existing block chain, stored at the service provider, if one already exists. For example, in an embodiment described with reference to FIG. 5, following execution of code instructions 501, 502, and 503, the enterprise system 510 may generate an execution log describing such an execution. The execution log in such an embodiment may include metadata for the datasets created, read, updated, or deleted pursuant to the code instructions 501, 502, and 503, and may describe the dataset field name and dataset field values for each dataset involved, and the address-identified memory locations at which each dataset has been stored. For example, an execution log in an embodiment may include a first entry indicating a first dataset with a dataset field name "social" and a dataset field value "123-45-6789" was read from database 542, a second entry indicating a second dataset with a dataset field name "SSN" was updated to include dataset field value "123-45-6789" at data lake 544, and a third entry indicating a third dataset with a dataset field name "social_security_number," and a dataset field value "123-45-6789" was created within files 546. The enterprise system 510 in such an embodiment may transmit the execution log 504 to the master data management module 533 managed by the service provider 530.

Upon receipt of the execution log at the service provider 530, the master data management module 533 may determine whether the execution log includes metadata for any datasets flagged by the user for block chain tracking. If the execution log includes such metadata, the master data management module 533 may parse such metadata from the execution log, and transmit instructions 505 to the block chain module 534 to create a new metadata tracking block associated with each flagged dataset within the parsed metadata. For example, the execution log may have flagged the first dataset with a dataset field name "social" and a dataset field value "123-45-6789," the second dataset with a dataset field name "SSN" and a dataset field value "123-45-6789," and the third entry indicating a third dataset with a dataset field name "social_security_number" for block chain tracking. In such an embodiment, the master data management module 533 may transmit an instruction 505 to the block chain module 534 to store in the block chain hyperledger 535 metadata associated with these three datasets in the execution log in a new metadata tracking block, and to link that newly created block to an already established block or block chain stored in the block chain hyperledger 535 and associated with the dataset field value "123-45-6789." The block chain module 534 may then store the newly created block within the service provider system 530, and update the block chain hyper ledger 535 to reflect addition of the newly created block to the pre-existing block chain associated with the data field value "123-45-6789."

In some embodiments, later executions of the same integration process may result in creation of new metadata tracking blocks associated with the same dataset field value. Each of these metadata tracking blocks, generated at multiple steps within the execution of a single integration process, or generated pursuant to multiple executions of an integration process, may be linked together to form a block chain describing each of the locations at which a single dataset field value has been stored, or transactions involving updating or deleting data at these locations. Such block chains may be searched by dataset field value, or by another metadata field value set by the user. In such a way, the block chain associated with a single dataset field value may track the locations of that dataset over time, and states of operation on the stored data, even if the dataset field name describing that dataset field value has changed over time. At this point, the flow may end however, the block chain ledger continues to maintain a record of activities involving sensitive personal data for tracking purposes as operated on by the integration.

Figure 9:
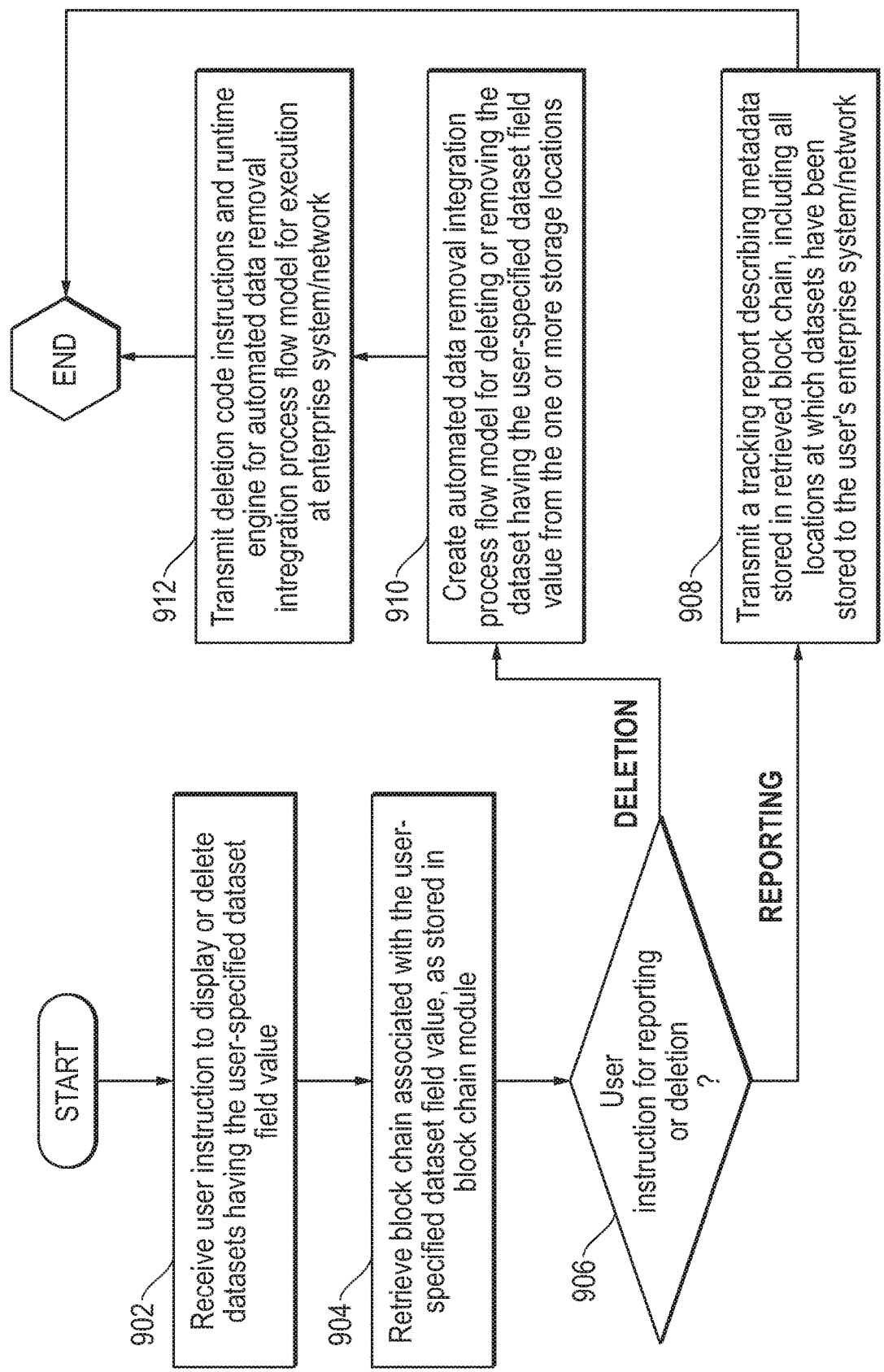
FIG. 9 is a flow diagram illustrating a method of reporting metadata for user-identified datasets transmitted according to a customized data integration process according to an embodiment of the present disclosure.

FIG. 9 is a flow diagram illustrating a method of reporting metadata for or automatically deleting user-identified datasets transmitted according to a customized data integration process according to an embodiment of the present disclosure. As described herein, users executing customized data integration processes for creation, reading, updating, or deletion of datasets containing potentially sensitive personal information may request a report of locations at which a given dataset field value may have been stored over time, pursuant to executed, customized data integration processes. Such reporting may assist in avoiding or mitigating infringement of the GDPR.

The block chain based data protection system in an embodiment may receive a user instruction to display or delete datasets having the user-specified dataset field value, or meeting user-specified search terms at block 902. As described herein, users executing customized data integration processes for creation, reading, updating, or deletion of datasets containing potentially sensitive personal information may request a report of known storage locations for a given dataset field value over time, pursuant to such executed customized data integration processes in embodiments. As also described herein, a user may further request removal of such dataset field values at one or more of such known storage locations. For example, if an employee leaves a position with the user, the user may wish to remove all potentially sensitive personal information associated with that employee at each address-identified memory location under the control of the user/employer. In an embodiment described with reference to FIG. 6, for example, a user may transmit a user reporting instruction 601 or a user deletion instruction 602 from the enterprise system 610 to the master data management module 633. As described herein, such a user reporting instruction 601 or user deletion instruction 602 in such an embodiment may identify the dataset field value by providing a an exact user-specified dataset field value (e.g., "123-45-6789"), or by providing a user-specified search term (e.g., "social_security_number") which may be used to identify a block chain associated with an exact dataset field value (e.g., "123-45-6789").

At block 904, the block chain based data protection system in an embodiment may retrieve the block chain associated with the user-specified dataset field value or the user-specified search terms, as stored in the block chain module. For example, in an embodiment described with reference to FIG. 6 in which the service provider 630 receives a user reporting instruction 601 or a user deletion instruction 602 for all datasets having a field value "123-45-6789," the master data management module 633 may transmit an instruction 603 to the block chain module 634 to retrieve all block chains associated in the block chain hyperledger 635 with a dataset field value "123-45-6789." The block chain module 634 in such an embodiment may transmit all block chains 604 associated with dataset field value "123-45-6789" back to the master data management module 633.

In another example embodiment in which the service provider 630 receives a user reporting instruction 601 or a user deletion instruction 602 for all datasets associated with the search term "social_security_number," the master data management module 633 may transmit an instruction 603 to the block chain module 634 to retrieve all block chains associated within the block chain hyper ledger 635 with the search term "social_security_number." The block chain module 634 in such an embodiment may then transmit all block chains 604 associated with the search term "social_security_number" back to the master data management module 633. For example, the block chain module 634 may transmit a block chain 604 containing several blocks describing metadata associated with a dataset field value "123-45-6789" or other social security numbers to the master data management module 633. Several of the blocks in such a block chain 604 in such an embodiment may contain metadata describing storage, updates, or deletion of the dataset field value "123-45-6789" under dataset field names not containing or matching the search term "social_security_number" (e.g., "social," or "SSN"). In such a way, the user may identify storage locations and states of sensitive data stored there for all datasets containing sensitive personal information described in terms similar to "social_security_number," by providing only the single search term "social_security_number."

At block 906, the block chain based data protection system in an embodiment may determine whether the received user instruction requests reporting or deletion of a dataset from one or more storage locations identified within the retrieved block chain. For example, in an embodiment described with reference to FIG. 6, a service provider 630 in an embodiment may receive a user reporting instruction 601 or a user deletion instruction 602 for a specifically identified dataset field value, or for a dataset meeting a user-specified search term in an embodiment. If the received user instruction or request (e.g., 601) requests generation of a report, the method may proceed to block 908 for generation of such a report. If the received user instruction or request (e.g., 602) requests deletion of a dataset, the method may proceed to block 910 for execution of an automated deletion process.

In an embodiment in which a user request for reporting has been received at block 906, a report describing metadata stored in the retrieved block chain, including statuses and all locations at which datasets including the user-specified dataset field value or meeting the user-identified search terms have been stored may be transmitted to the user's enterprise system/network in an embodiment at block 908. For example, in an embodiment described with reference to FIG. 6, the master data management module 633 may receive block chains 604 matching a user-specified dataset field value or one or more user-specified search terms. In such an embodiment, the master data management module 633 may parse the information given within one or more received block chains 604, to identify address-identified memory locations at which a user-specified dataset field value or a dataset field value matching user-specified search terms has been stored, and to generate a report 605 detailing such information. Such a report 605 may further detail other information given within the block chain(s) 604 associated with such a dataset field value, and parsed by the master data management module 633. At block 908, the master data management module 633 in such an embodiment may transmit the report 605 for review at the enterprise system/network 610. In such a way, the block chain based data protection system in embodiments may enable users to comply with GDPR requirements by generating a report detailing each of the address-identified memory locations at which the user-identified dataset field value has been stored, and the dataset field name associated with that dataset field value at each of these address-identified memory locations. For a reporting instruction, the method may then end.

For a user deletion instruction at block 906, the block chain based data protection system in an embodiment may create an automated deletion process flow model for deleting datasets including the user-identified dataset field value or meeting the user-identified search terms from storage locations identified in the retrieved block chain at block 910. For example, in an embodiment described with reference to FIG. 7, the master data management module 733 in an embodiment may reference the block chain associated with a specifically identified dataset, as received from the block chain module 734, to identify one or more address-identified memory locations (e.g., database 742, data lake 744, and within the files 746) at which the dataset has been stored, or at which it is currently stored and has not been deleted. The master data management module 733 in such an embodiment may transmit instructions 701 to the data integration process module 731 to generate a deletion process for deletion of the datasets identified within the user deletion instruction from one or more of the locations 742, 744, or 746 at which the identified dataset is currently stored. In response to the instruction 701, the data integration processing module 731 in an embodiment may generate a deletion process flow model for such a deletion process. For example, the data integration processing module 731 may generate a deletion process flow model such as that discussed above with respect to FIG. 3B. The deletion code instructions associated with each of the visual elements depicted in such an embodiment described with respect to FIG. 3B, as well as the runtime engine generated by the data integration process module 731 for execution of such deletion code instructions may be stored at the data integration process module 731 upon automatic creation of such a deletion process flow model.

At block 912, the block chain data protection system in an embodiment may transmit deletion code instructions and runtime engine for execution of the automated deletion process at an enterprise system/network. For example, in an embodiment described with reference to FIG. 7, the data integration process module 731 in an embodiment may transmit the underlying deletion code instructions and runtime engine 706 directly to the enterprise system/network 710 for execution of the deletion process modeled by the deletion process flow model (e.g., as described with reference to FIG. 3B) at that location. In other embodiments, the data integration process module 731 may transmit the underlying deletion code instructions and runtime engine 702 to the master data management module 733.

In an embodiment, the runtime engine may be executed at the enterprise system/network 710 to perform the deletion process received from the data integration process module 731. Such a deletion process may operate to delete one or more datasets identified by the enterprise system/network 710 in the user deletion instruction from one or more locations 742, 744, or 746 identified as currently storing such identified datasets by the master data management module 733. For example, the deletion process initiated by the master data management module 733 and executed by the received runtime engine 706 may operate to transmit an instruction 707 to delete the identified dataset from the database 742, an instruction 708 to delete the identified dataset from the data lake 744, or an instruction 709 to delete the identified dataset from the files 746. In an alternate embodiment in which the master data management hub 733 automatically executes the runtime engine, the instructions 703, 704, and 705 may be transmitted to the database 742, data lake 744, or files 746, respectively, from the master data management hub 733. In such a way, the block chain based data protection system in an embodiment may automatically delete datasets identified by a user as potentially containing sensitive personal information, and enable users to comply with GDPR requirements by mitigating propagation of sensitive personal data. At this point, the process may end.

The blocks of the flow diagrams 8-9 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a block chain based data protection system comprising:
   a processor executing code instructions of the block chain based data protection system receiving a user block chain instruction to record a first address-identified memory location at which a dataset field value containing sensitive personal information is stored pursuant to a customized data integration process modeled via a graphical user interface including blockchain tracking to track the sensitive personal information as it is processed through the customized data integration process;
   the processor creating a block chain associated with the dataset field value containing the sensitive personal information;
   a network interface device receiving an identification of the first address-identified memory location from a remote execution location for the customized data integration process;
   the processor creating a first block storing the identification of the first address-identified memory location within the block chain;
   the graphical user interface receiving a user reporting instruction to generate a tracking report for the sensitive personal information;
   the processor generating the tracking report including the identification of the first address-identified memory location based on the block chain associated with the dataset field value containing the sensitive personal information; and
   the network interface device transmitting the tracking report to the remote execution location.

2. The information handling system of claim 1 further comprising:
   the processor executing code instructions of the block chain based data protection system receiving a user deletion instruction to delete the dataset field value from the first address-identified memory location;
   the processor automatically generating a runtime engine and machine executable deletion code instructions for deletion of the dataset field value from the first address-identified memory location; and
   the network interface device transmitting the runtime engine and the machine executable deletion code instructions for execution at the remote execution location.

3. The information handling system of claim 2 further comprising:
   the processor creating a second block recording deletion of the dataset field value from the first address-identified memory location.

4. The information handling system of claim 1 further comprising:
   the processor associating the block chain with a plurality of dataset field names for the dataset field value; and
   the user reporting instruction including an instruction to generate a tracking report for datasets meeting a user-specified search term included within one or more of the plurality of dataset field names.

5. The information handling system of claim 1 further comprising:
   the user reporting instruction including an instruction to generate a tracking report for datasets including the dataset field values.

6. The information handling system of claim 1 further comprising:
   the processor generating code instructions for the customized data integration process modeled via the graphical user interface to store the dataset field value at a plurality of address-identified memory locations, including the first address-identified memory location;
   the network interface device receiving an identification of each of the plurality of address-identified memory locations from a remote execution location for the customized data integration process; and
   the processor creating a plurality of blocks within the block chain recording an identification of one of the plurality of address-identified memory locations.

7. The information handling system of claim 6 further comprising:
   the tracking report including the identification of each of the plurality of address-identified memory locations based on the block chain associated with the dataset field value containing sensitive personal information.

8. A method of block chain based data protection comprising:
   receiving, via a block chain based data protection system, a user block chain instruction to record a first address-identified memory location at which a dataset field value containing sensitive personal information is stored pursuant to a customized data integration process modeled via a graphical user interface;
   creating a block chain associated with the dataset field value containing sensitive personal information, via a processor;
   receiving an identification, via a network interface device, of the first address-identified memory location from a remote execution location for the customized data integration process;
   creating, via the processor, a first block storing the identification of the first address-identified memory location within the block chain;
   receiving, via the block chain based data protection system, a user deletion instruction to delete the dataset field value from the first address-identified memory location;
   automatically generating, via the processor, a first runtime engine and first machine executable deletion code instructions for deletion of the dataset field value from the first address-identified memory location; and
   transmitting, via the network interface device, the first runtime engine and the first machine executable deletion code instructions for execution at the remote execution location.

9. The method of claim 8 further comprising:
   receiving, via the block chain based data protection system, a user reporting instruction to generate a tracking report for the dataset field value;
   generating the tracking report, via the processor, including the identification of the address-identified memory location based on the block chain associated with the dataset field value and deletion states at the first address-identified memory location; and
   transmitting the tracking report to the remote location.

10. The method of claim 8 further comprising:
associating, via the processor, the block chain with a plurality of dataset field names for the dataset field value; and
determining one of the plurality of dataset field names meets a user-specified search term included within the user deletion instruction.

11. The method of claim 8 further comprising:
determining the dataset field value associated with the block chain matches a user-specified dataset field value included within the user deletion instruction.

12. The method of claim 8 further comprising:
generating code instructions for the customized data integration process modeled via the graphical user interface to store the dataset field value at a plurality of address-identified memory locations, including the first address-identified memory location, via the processor;
receiving, via the network interface device, an identification of each of the plurality of address-identified memory locations from a remote execution location for the customized data integration process; and
creating, via the processor, a plurality of blocks within the block chain recording an identification of one of the plurality of address-identified memory locations within each of the plurality of blocks.

13. The method of claim 12 further comprising:
receiving, via the graphical user interface, a user deletion instruction to delete the dataset field value;
determining the identification of each of the plurality of address-identified memory locations based on the block chain associated with the dataset field value;
automatically generating a second runtime engine and second machine executable deletion code instructions for deletion of the dataset field value from each of the plurality of address-identified memory locations; and
transmitting, via the network interface device, the second runtime engine and the second machine executable deletion code instructions for execution at the remote execution location.

14. The method of claim 8 further comprising:
receiving, via the network interface device, notification that the dataset field value has been deleted from each of the plurality of address-identified memory locations; and
creating, via the processor, a plurality of blocks recording deletion of the dataset field value from the plurality of address-identified memory locations.

15. An information handling system operating a block chain based data protection system comprising:
a processor executing code instructions of the block chain based data protection system for receiving a user block chain instruction to record a plurality of address-identified memory locations at which a dataset field value containing sensitive personal information is stored pursuant to a customized data integration process modeled via a graphical user interface;
the processor creating a block chain associated with the dataset field value containing sensitive personal information;
a network interface device receiving an identification of each of the plurality of address-identified memory locations from a remote execution location for the customized data integration process;
the processor creating a plurality of blocks stored within the block chain;
each of the plurality of blocks storing an identification of one of the plurality of address-identified memory locations;
the processor receiving a first user deletion instruction to delete the dataset field value from a first address-identified memory location within the plurality of address-identified memory locations;
the processor automatically generating a runtime engine and machine executable deletion code instructions for deletion of the dataset field value from the first address-identified memory location; and
the network interface device transmitting the runtime engine and the machine executable deletion code instructions for execution at the remote execution location.

16. The information handling system of claim 15 further comprising:
the processor executing code instructions of the block chain based data protection system receiving a user reporting instruction to generate a tracking report for the dataset field value;
the processor generating the tracking report including the identification of each of the plurality of address-identified memory locations based on the block chain associated with the dataset field value containing sensitive personal information; and
the network interface device transmitting the tracking report to the remote execution location.

17. The information handling system of claim 15 further comprising:
the network interface device receiving notification that the dataset field value has been deleted from the first address-identified memory location; and
the processor creating a second block recording deletion of the dataset field value from the first address-identified memory location.

18. The information handling system of claim 17 wherein the tracking report further includes a report that the dataset field value has been deleted from the first address-identified memory location.

19. The information handling system of claim 17 wherein the second block contains a hash of information stored in the first block.

20. The information handling system of claim 15 further comprising:
the processor associating the block chain with a plurality of dataset field names for the dataset field value; and
the first user deletion instruction including an instruction to delete datasets meeting a user-specified search term included within one or more of the plurality of dataset field names.

* * * * *